United States Patent
Sasaki

(10) Patent No.: US 6,387,285 B1
(45) Date of Patent: May 14, 2002

(54) METHOD OF MANUFACTURING THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/436,228

(22) Filed: Nov. 9, 1999

(30) Foreign Application Priority Data

Nov. 18, 1998 (JP) .......................................... 10-327606

(51) Int. Cl.[7] ................................................. G11B 5/39
(52) U.S. Cl. ........................... 216/38; 216/18; 216/22; 216/53; 360/313; 360/319; 360/320
(58) Field of Search .............................. 216/17, 18, 22, 216/38, 52, 53; 360/313, 319, 320; 29/603.01

(56) References Cited

U.S. PATENT DOCUMENTS

| | | | |
|---|---|---|---|
| 5,555,147 A | * 9/1996 | Maruyama | 360/113 |
| 5,665,251 A | * 9/1997 | Robertson et al. | 216/22 |
| 5,777,542 A | * 7/1998 | Ohsawa et al. | 338/32 |
| 5,872,691 A | * 2/1999 | Fukuyama et al. | 360/113 |
| 5,907,459 A | 5/1999 | Shouji et al. | |
| 5,936,812 A | * 8/1999 | Terunuma et al. | 360/113 |
| 5,936,813 A | * 8/1999 | Kim et al. | 360/113 |
| 6,024,886 A | * 2/2000 | Han et al. | 216/38 |
| 6,074,566 A | * 6/2000 | Hsiao et al. | 216/2 |
| 6,195,229 B1 | * 2/2001 | Shen et al. | 360/113 |

FOREIGN PATENT DOCUMENTS

| | | | |
|---|---|---|---|
| JP | 09-293213 | * 11/1997 | G11B/5/39 |
| JP | 9-312006 | 12/1997 | |
| JP | 10-3617 | 1/1998 | |

* cited by examiner

Primary Examiner—Frankie L. Stinson
Assistant Examiner—Jiri Smetana
(74) Attorney, Agent, or Firm—Oliff & Berridge, PLC

(57) ABSTRACT

It is an object of a method of manufacturing a thin-film magnetic head of the invention to improve the insulating property between an electrode connected to a magnetoresistive element and a shield layer without increasing the thickness of an insulating layer between the magnetoresistive element and the shield layer. In the method, a pair of conductive layers to be the electrode (lead) connected to the MR element are formed on an insulating layer. Magnetic layers are formed to surround the conductive layers while an insulating film is placed between the magnetic layers and the conductive layers. Next, an insulating layer of alumina, for example, is formed over the entire surfaces of the magnetic layers. This insulating layer is polished to the surfaces of the conductive layers and flattened. Through this flattening process, a structure is obtained in which the magnetic layers are made to be a bottom shield layer, and in grooves thereby made in the bottom shield layer, the conductive layers are formed in a self-aligned manner.

9 Claims, 17 Drawing Sheets

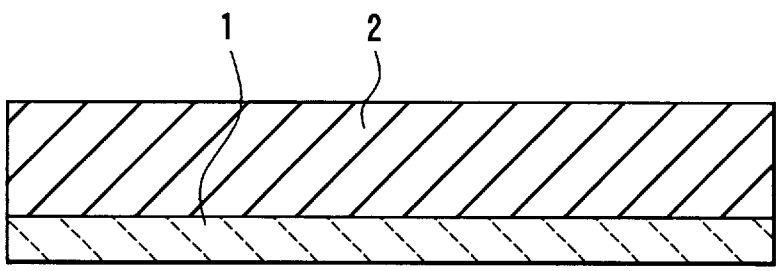
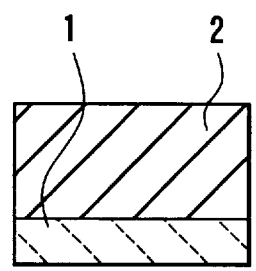
FIG. 1A
FIG. 1B
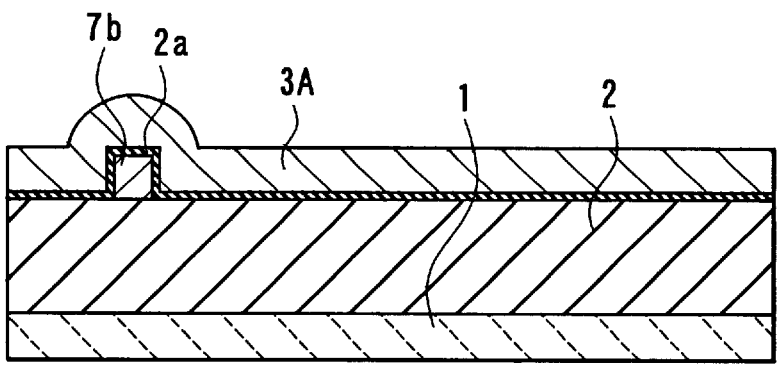
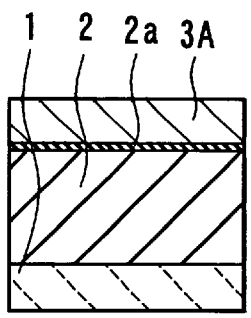
FIG. 2A
FIG. 2B
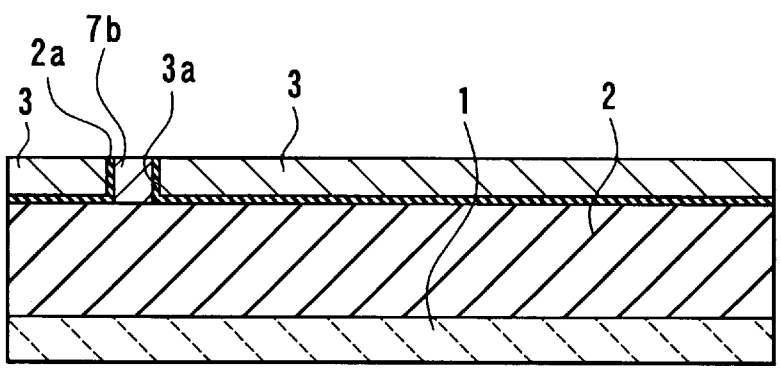
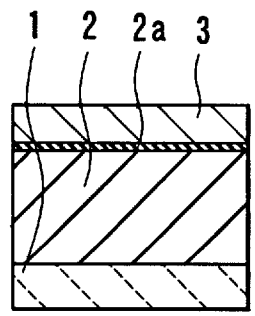
FIG. 3A
FIG. 3B

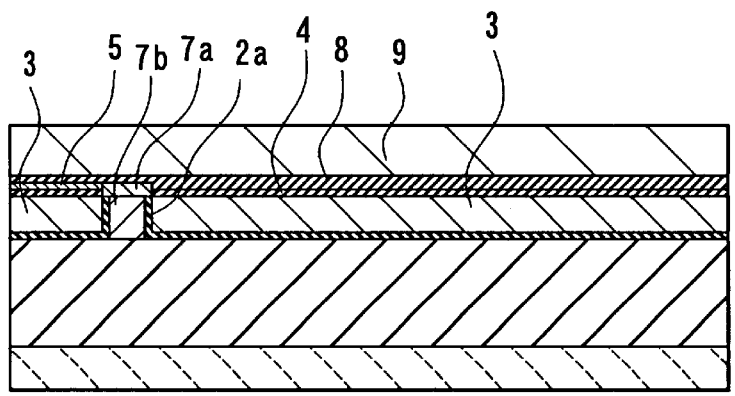 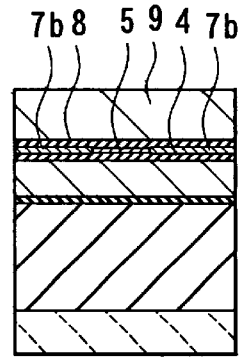
FIG. 4A          FIG. 4B
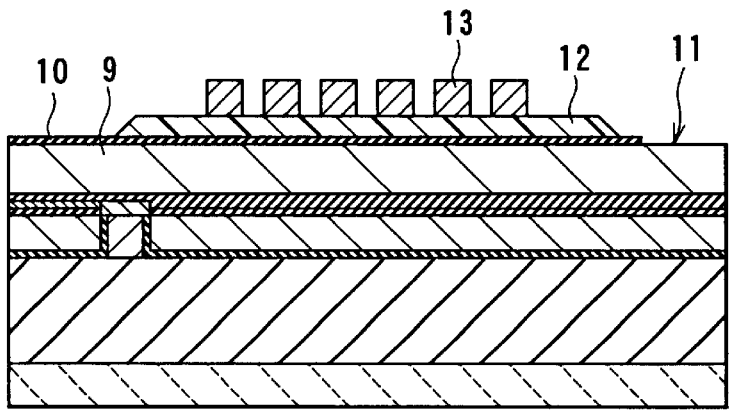 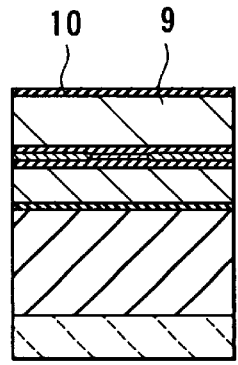
FIG. 5A          FIG. 5B
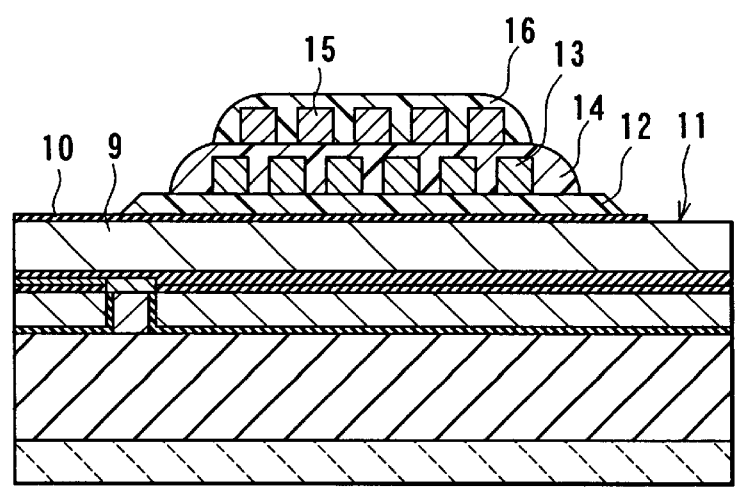 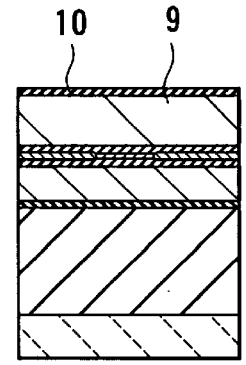
FIG. 6A          FIG. 6B

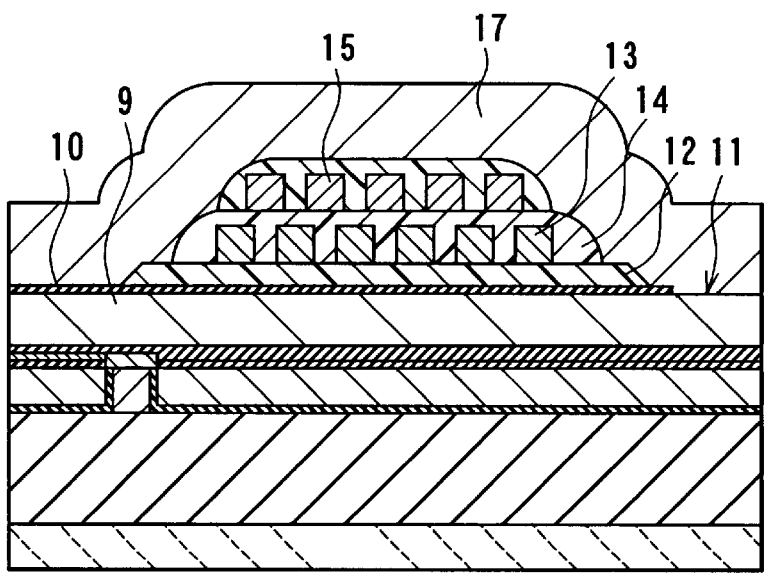
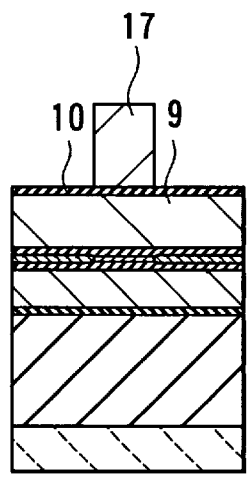
FIG. 7A
FIG. 7B
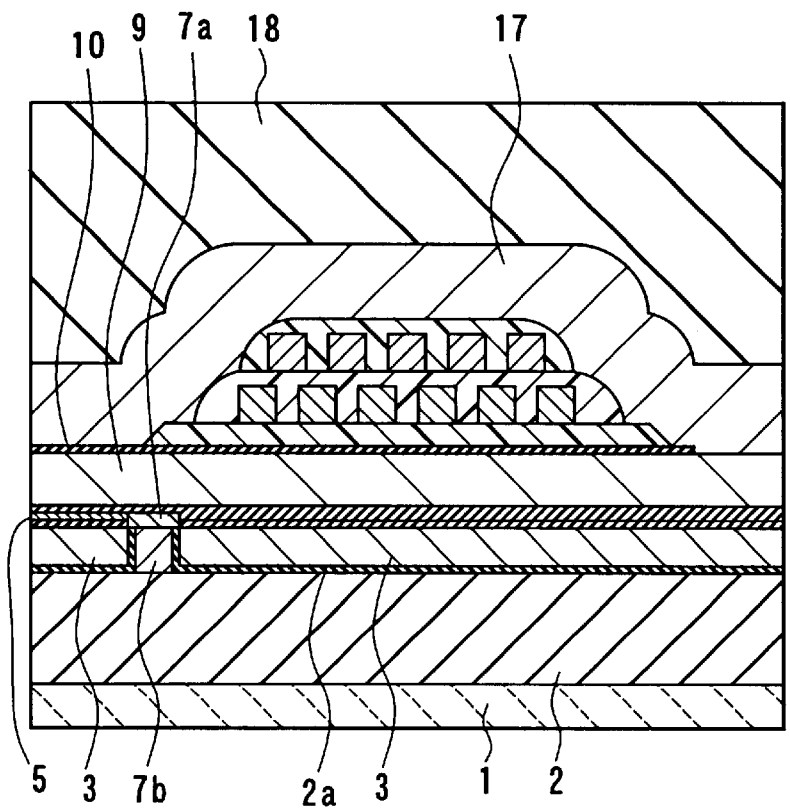
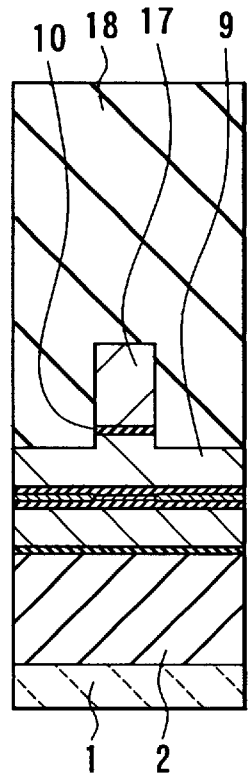
FIG. 8A
FIG. 8B

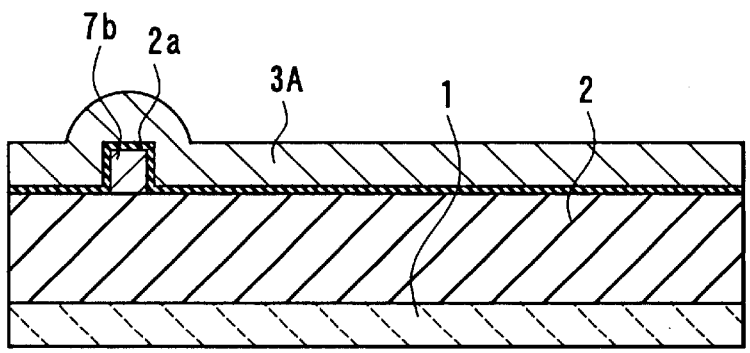
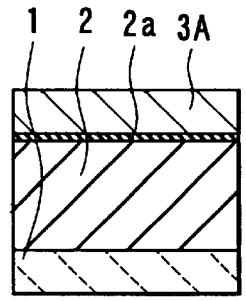
FIG. 12A    FIG. 12B
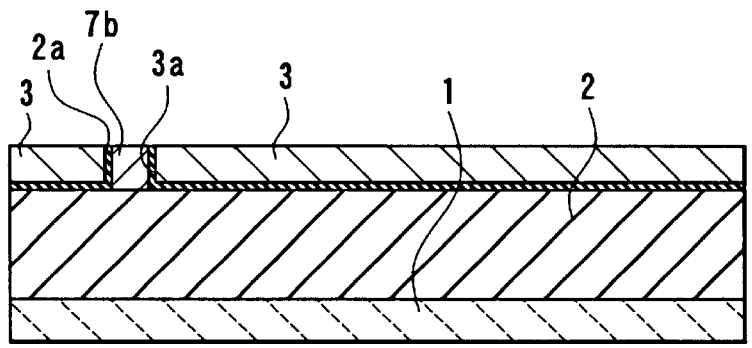
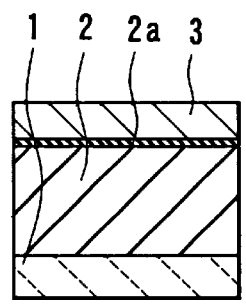
FIG. 13A    FIG. 13B
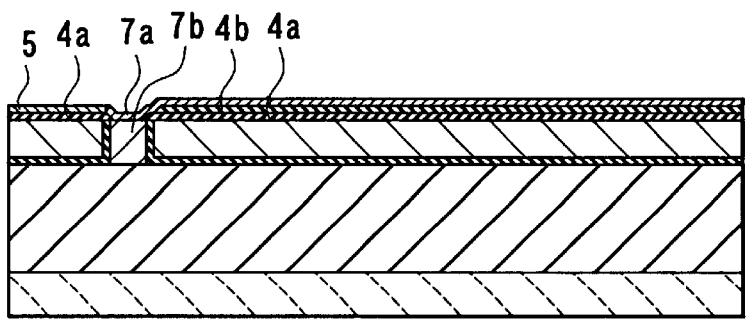
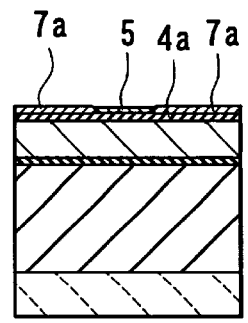
FIG. 14A    FIG. 14B

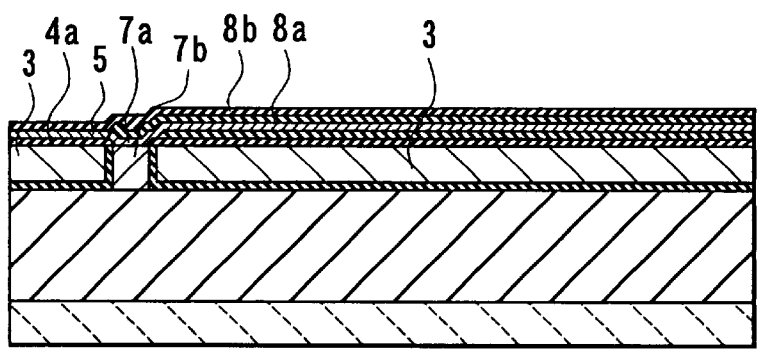 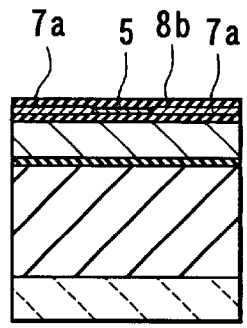
FIG. 15A  FIG. 15B
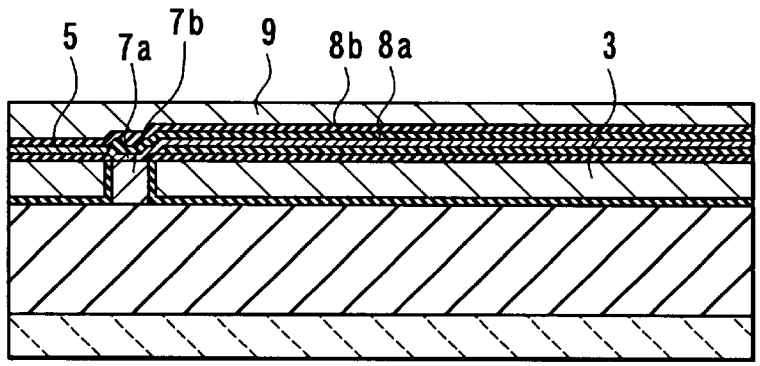 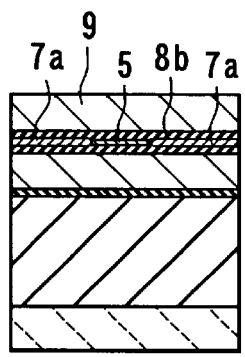
FIG. 16A  FIG. 16B
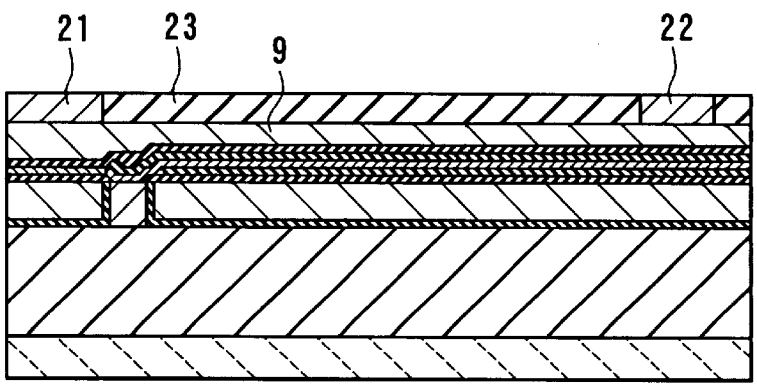 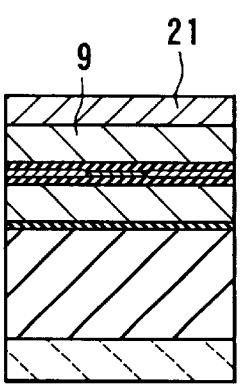
FIG. 17A  FIG. 17B

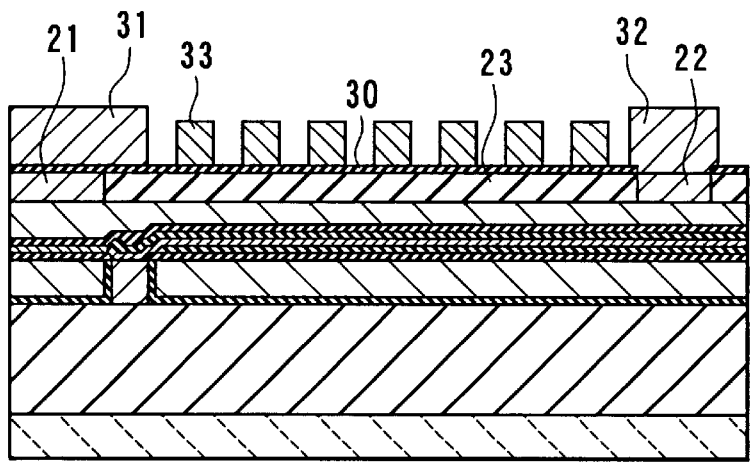 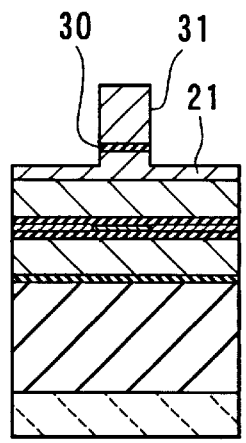
FIG. 18A    FIG. 18B
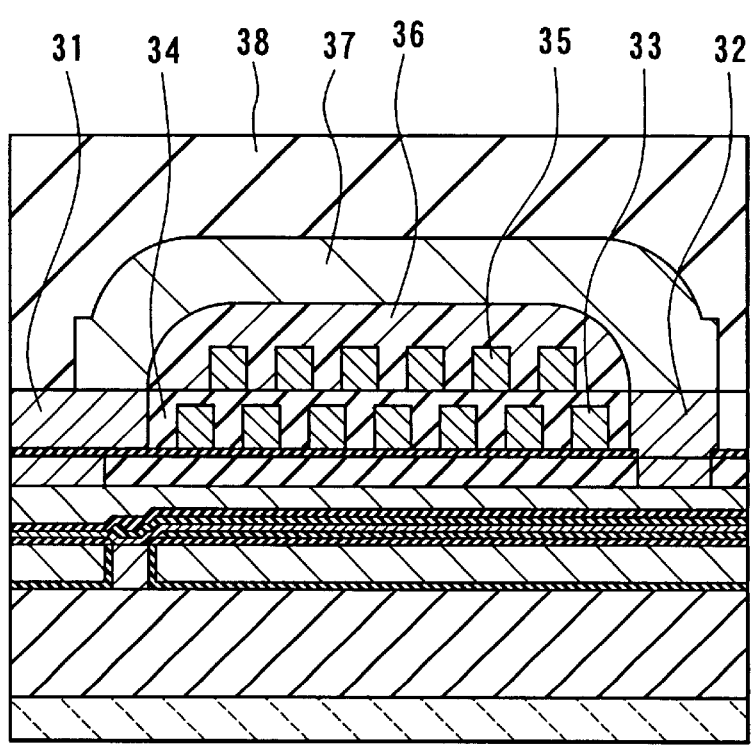 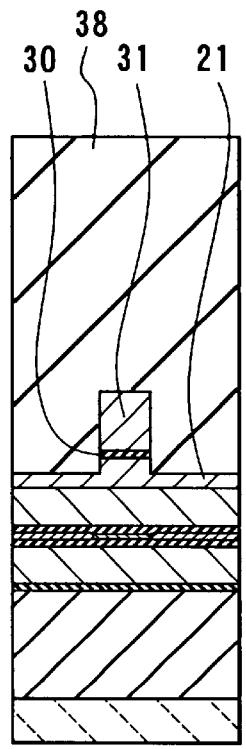
FIG. 19A    FIG. 19B

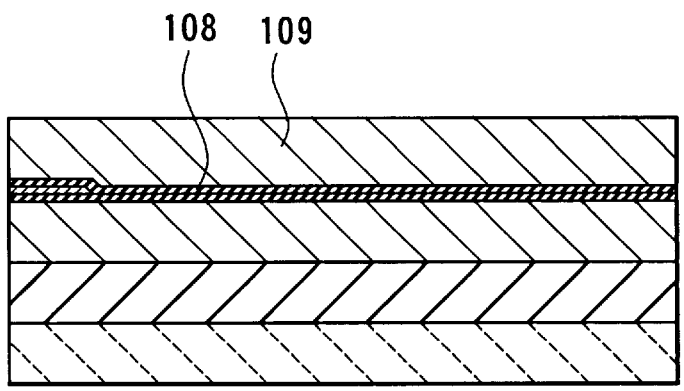
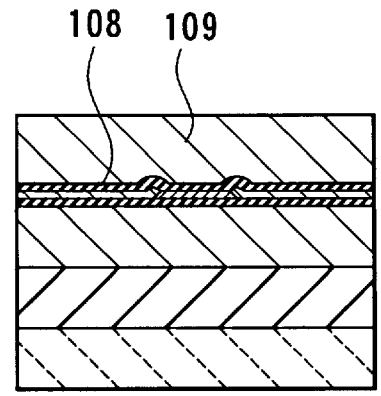
FIG. 26A
RELATED ART
FIG. 26B
RELATED ART
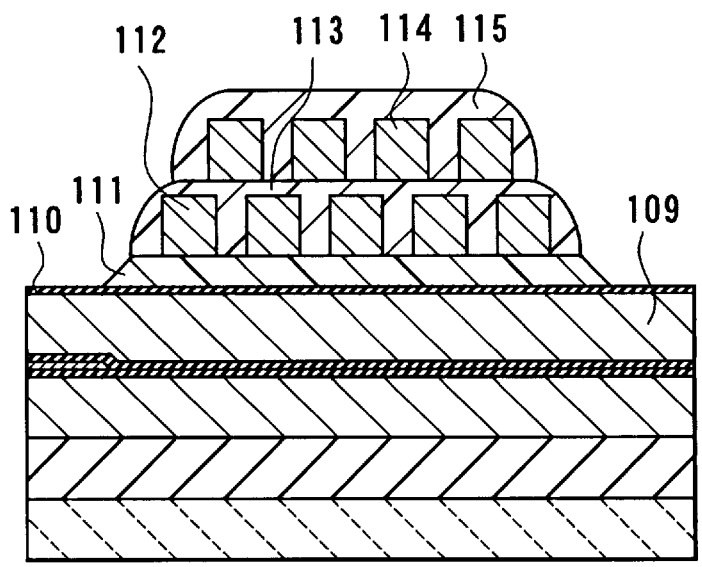
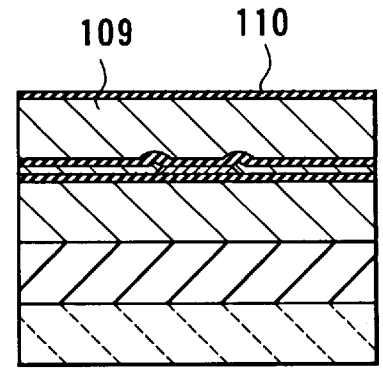
FIG. 27A
RELATED ART
FIG. 27B
RELATED ART

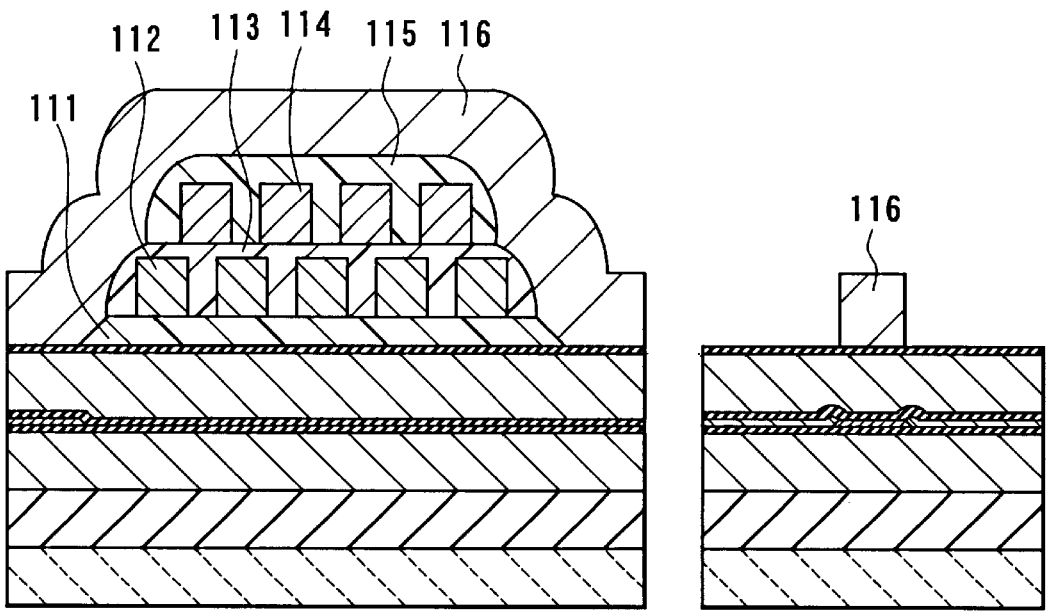
FIG. 28A
RELATED ART
FIG. 28B
RELATED ART
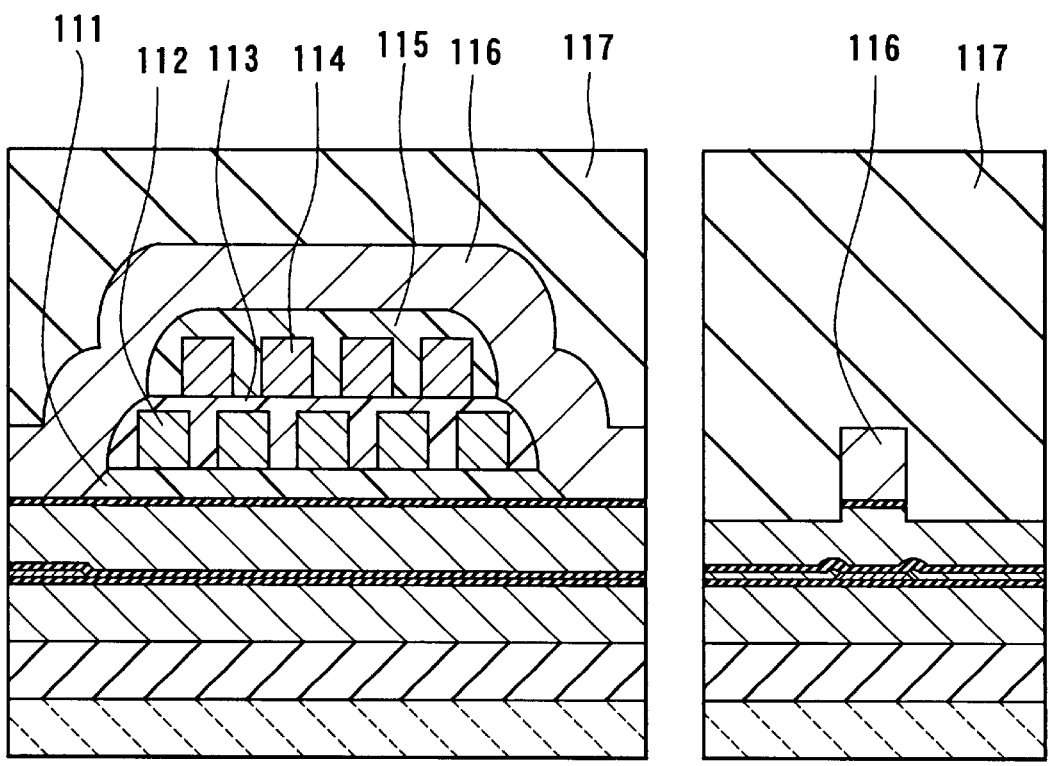
FIG. 29A
RELATED ART
FIG. 29B
RELATED ART

METHOD OF MANUFACTURING THIN-FILM MAGNETIC HEAD

BACKGROUND OF THE INVENTION

1. Field of the Invention

The present invention relates to a method of manufacturing a thin-film magnetic head having at least a magnetoresistive element for reading.

2. Description of the Related Art

Performance improvements in thin-film magnetic heads have been sought with an increase in surface recording density of a hard disk drive. A composite thin-film magnetic head has been widely used, which is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Methods for improving the performance of a reproducing head include replacing an AMR film with a GMR film and the like made of a material or a configuration having an excellent magnetoresistive sensitivity, or optimizing the MR height of the MR film. The MR height is the length (height) between the air-bearing-surface-side end of an MR element and the other end. The MR height is controlled by an amount of lapping when the air bearing surface is processed. The air bearing surface is the surface of a thin-film magnetic head that faces a magnetic recording medium and may be called a track surface as well.

Many of reproducing heads have a structure in which the MR element is electrically and magnetically shielded by a magnetic material.

Reference is now made to FIG. 22A to FIG. 29A, FIG. 22B to FIG. 29B, FIG. 31 and FIG. 32 to describe an example of a manufacturing method of a composite thin-film magnetic head as an example of a related-art manufacturing method of a thin-film magnetic head. FIG. 22A to FIG. 29A are cross sections each orthogonal to the air bearing surface of the head. FIG. 22B to FIG. 29B are cross sections each parallel to the air bearing surface of the pole portion of the head.

According to the manufacturing method, as shown in FIGS. 22A and 29B, an insulating layer 102 made of alumina ($Al_2O_3$), for example, of about 5 to 10 μm in thickness is deposited on a substrate 101 made of aluminum oxide and titanium carbide ($Al_2O_3$—TiC), for example. On the insulating layer 102 a bottom shield layer 103 made of a magnetic material and having a thickness of 2 to 3 μm is formed for a reproducing head.

Next, as shown in FIGS. 23A and 23B, on the bottom shield layer 103, alumina or aluminum nitride, for example, is deposited to a thickness of 50 to 100 nm through sputtering to form a bottom shield gap film 104 as an insulating layer. On the bottom shield gap film 104, an MR film having a thickness of tens of nanometers is formed for making an MR element 105 for reproduction. Next, on the MR film a photoresist pattern 106 is selectively formed where the MR element 105 is to be formed. The photoresist pattern 106 is formed into a shape that easily allows lift-off, such as a shape having a T-shaped cross section. Next, with the photoresist pattern 106 as a mask, the MR film is etched through ion milling, for example, to form the MR element 105. The MR element 105 may be either a GMR element or an AMR element.

Next, as shown in FIGS. 24A and 24B, on the bottom shield gap film 104, a pair of first electrode layers 107 whose thickness is tens of nanometers are formed, using the photoresist pattern 106 as a mask. The first electrode layers 107 are electrically connected to the MR element 105. The first electrode layers 107 may be formed through stacking TiW, CoPt, TiW, and Ta, for example. Next, as shown in FIGS. 25A and 25B, the photoresist pattern 106 is lifted off. Although not shown in FIGS. 25A and 25B, a pair of second electrode layers whose thickness is 50 to 100 nm are formed into a specific pattern. The second electrode layers are electrically connected to the first electrode layers 107. The second electrode layers may be made of copper (Cu), for example. The first electrode layers 107 and the second electrode layers make up an electrode (that may be called a lead as well) electrically connected to the MR element 105.

Next, as shown in FIG. 26A and FIG. 26B, a top shield gap film 108 having a thickness of 50 to 150 nm is formed as an insulating layer on the bottom shield gap film 104 and the MR element 105. The MR element 105 is embedded in the shield gap films 104 and 108. Next, on the top shield gap film 108, a top shield layer-cum-bottom pole (called a top shield layer in the following description) 109 having a thickness of about 3 μm is formed. The top shield layer 109 is made of a magnetic material and used for both a reproducing head and a recording head.

Next, as shown in FIG. 27A and FIG. 27B, on the top shield layer 109, a recording gap layer 110 made of an insulating film such as an alumina film whose thickness is 0.2 to 0.3 μm is formed. On the recording gap layer 110, a photoresist layer 111 for determining the throat height is formed into a specific pattern whose thickness is about 1.0 to 2.0 μm. Next, on the photoresist layer 111, a thin-film coil 112 of a first layer is made for the induction-type recording head. The thickness of the thin-film coil 112 is 3 μm. Next, a photoresist layer 113 is formed into a specific pattern on the photoresist layer 111 and the coil 112. On the photoresist layer 113, a thin-film coil 114 of a second layer is then formed into a thickness of 3 μm. Next, a photoresist layer 115 is formed into a specific pattern on the photoresist layer 113 and the coil 114.

Next, as shown in FIG. 28A and FIG. 28B, the recording gap layer 110 is partially etched in a portion behind the coils 112 and 114 (the right side of FIG. 28A) to form a magnetic path. A top pole 116 having a thickness of about 3 μm is then formed for the recording head on the recording gap layer 110 and the photoresist layers 111, 113 and 115. The top pole 116 is made of a magnetic material such as Permalloy (NiFe) or FeN as a high saturation flux density material. The top pole 116 is in contact with the top shield layer (bottom pole) 109 and is magnetically coupled to the top shield layer 109 in a portion behind the coils 112 and 114.

As shown in FIG. 29A and FIG.29B, the recording gap layer 110 and the top shield layer (bottom pole) 109 are etched through ion milling, using the top pole 116 as a mask. Next, an overcoat layer 117 of alumina, for example, having a thickness of 20 to 30 μm is formed to cover the top pole 116. Finally, machine processing of the slider is performed to form the air bearing surfaces of the recording head and the reproducing head. The thin-film magnetic head is thus completed. As shown in FIG. 29A and FIG. 29B, the structure is called a trim structure wherein the sidewalls of the top pole 116, the recording gap layer 110, and part of the top shield layer (bottom pole) 109 are formed vertically in a self-aligned manner. The trim structure suppresses an increase in the effective track width due to expansion of the magnetic flux generated during writing in a narrow track.

FIG. 30 is a top view wherein the MR element 105, the first electrode layers 107 and the second electrode layers 118 are formed on the bottom shield gap film 104. FIG. 31 is a top view of the thin-film magnetic head manufactured as described above. The overcoat layer 117 is omitted in FIG. 31. FIG. 22A to FIG. 29A are cross sections taken along line 29A—29A of FIG. 31. FIG. 22B to FIG. 29B are cross sections taken along line 29B—29B of FIG. 31.

As shown in FIG. 30 and FIG. 31, the related-art thin-film magnetic head has the structure wherein the electrode layers 107 and 118 connected to the MR element 105 are inserted in a wide region between the bottom shield layer 103 and the top shield layer 109 for shielding the MR element 105. The very thin bottom shield gap film 104 and top shield gap film 108 are each placed between the shield layer 103 and the electrode layers 107 and 118 and between the shield layer 109 and the electrode layers 107 and 118, respectively. High insulation property is therefore required for the shield gap films 104 and 108. The yield of the thin-film magnetic heads thus greatly depends on the insulation property.

With improvements in performance of the recording head, a problem of thermal asperity comes up. Thermal asperity is a reduction in reproducing characteristic due to self-heating of the reproducing head during reproduction. To overcome thermal asperity, a material with high cooling efficiency is required for the bottom shield layer 103 and the shield gap films 104 and 108 in the related art. Therefore, the bottom shield layer 103 is made of a magnetic material such as Permalloy or Sendust in the related art. The shield gap films 104 and 108 are made of a material such as alumina, through sputtering, into a thickness of 100 to 150 nm, for example. The shield gap films 104 and 108 thus magnetically and electrically isolate the shield layers 103 and 109 from the MR element 105 and the electrode layers 107 and 118.

It is inevitable that thermal asperity should be overcome in order to improve the performance of the reproducing head. Recently, the thickness of the shield gap films 104 and 108 has been reduced to as thin as 50 to 100 nm, for example. The cooling efficiency of the MR element 105 is thereby improved so as to overcome thermal asperity.

However, since the shield gap films 104 and 108 are formed through sputtering, faults may result in the magnetic and electrical insulation that isolates the shield layers 103 and 109 from the MR element 105 and the electrode layers 107 and 118, due to particles or pinholes in the films. Such faults more often result if the shield gap films 104 and 108 are thinner.

In order to improve the output characteristic of the reproducing head, it is preferred that the wiring resistance of the electrode connected to the MR element is as low as possible so that a minute change in the output signal corresponding to a minute change in resistance of the MR element can be detected. Therefore, the areas of the electrode layers 118 are often designed to be large in the related art. However, the areas of the portions of the electrode layers 118 that face the shield gap films 104 and 108 are increased, as a result. If the shield gap films 104 and 108 are thin as described above, magnetic and electrical insulation faults may more often result between the electrode layers 118 and each of the shield layers 103 and 109.

As described above, it is preferred that the wiring resistance of the electrode connected to the MR element is low to improve the output characteristic of the reproducing head. However, there is a limit to reducing the wiring resistance of the electrode since the electrode is made up of the electrode layers 107 and 118 as thin as 50 to 100 nm inserted between the shield layers 103 and 109 in the related-art thin-film magnetic head.

Since a narrow track width is required for the thin-magnetic head, a minute-size MR element is required. For a GMR head, in particular, it is required to precisely detect the output signal of the minute MR element. It is therefore required to reduce noises caused by internal factors such as the coils of the induction-type recording head or external factors such as the motor of the hard disk drive. However, the electrode layers 118 carry noises in the related-art thin-film magnetic head. Such noises may reduce the performance of the reproducing head.

In Japanese Patent Application Laid-open Hei 9-312006 (1997) a technique is disclosed for reducing the electric resistance of the lead and preventing insulation faults between the lead and the top shield. The length of the bottom shield is made shorter than the top shield in the direction of drawing out the lead connected to the MR element from between the top and bottom shields. The thickness of the portion of the lead between the top and bottom shields is made thin. The portion of the lead off the bottom shield is made thick and made to protrude downward.

In the technique, however, the lead is hardly shielded by the bottom shield. As a result, magnetic flux from the coil is easily received in the GMR head that requires a high output. The lead therefore tends to carry noises.

A technique disclosed in Japanese Patent Application Laid-open Hei 10-3617 (1998) is that a conductor connected to an MR element is embedded in a groove formed in an insulating layer between the MR element and a shield layer so as to reduce the shield gap.

However, this technique will not improve the insulation property between the lead and the shield layer.

OBJECTS AND SUMMARY OF THE INVENTION

It is a first object of the invention to provide a method of manufacturing a thin-film magnetic head for improving the insulation property between the shield layer and the electrode connected to the magnetoresistive element without increasing the thickness of the insulating layer between the shield layer and the magnetoresistive element.

It is a second object of the invention to provide a method of manufacturing a thin-film magnetic head for reducing the wiring resistance of the electrode connected to the magnetoresistive element.

It is a third object of the invention to provide a method of manufacturing a thin-film magnetic head for reducing the effect of noises on the magnetoresistive element.

A method of the invention is provided for manufacturing a thin-film magnetic head comprising: a magnetoresistive element; a first shield layer and a second shield layer for shielding the magnetoresistive element, the first shield layer and the second shield layer facing each other with the magnetoresistive element in between; a first insulating layer provided between the magnetoresistive element and the first shield layer and a second insulating layer provided between the magnetoresistive element and the second shield layer; and an electrode connected to the magnetoresistive element. One of the first and second shield layers has a groove in which at least part of the electrode is placed. The at least part of the electrode is insulated and placed in the groove. The method includes the steps of: forming the first shield layer; forming the first insulating layer on the first shield layer; forming the magnetoresistive element on the first insulating layer; forming the second insulating layer on the magnetoresistive element and the first insulating layer; forming the second shield layer on the second insulating layer; and forming the electrode connected to the magnetoresistive element. In the step of forming the electrode and the step of forming one of the shield layers, the electrode and the one of the shield layers are formed by forming the at least part of the electrode, and forming the one of the shield layers to surround the at least part of the electrode, an insulating film being placed between the at least part of the electrode and the one of the shield layers.

According to the method of manufacturing a thin-film magnetic head of the invention, at least part of the electrode is formed, and then one of the shield layers is formed to surround the at least part of the electrode while the insulating film is placed between the at least part of the electrode and the one of the shield layers. The at least part of the electrode is thereby insulated and placed in the groove of the one of the shield layers.

According to the method, the one of the shield layers may be the first shield layer. In the step of forming the electrode and the step of forming the first shield layer, the electrode and the first shield layer may be formed by forming the at least part of the electrode, forming a layer for shielding to be the first shield layer to surround the at least part of the electrode, an insulating film being placed between the at least part of the electrode and the layer for shielding, and flattening the layer for shielding so that the at least part of the electrode is exposed.

According to the method, the one of the shield layers may be the first shield layer. In the step of forming the electrode, the step of forming the first shield layer, and the step of forming the first insulating layer, the electrode, the first shield layer and the first insulating layer may be formed by: fabricating a first electrode portion that forms part of the electrode; fabricating a layer for shielding to be the first shield layer to surround the first electrode portion, an insulating film being placed between the first electrode portion and the layer for shielding; fabricating the first shield layer through flattening the layer for shielding so that the first electrode portion is exposed; fabricating the first insulating layer on the first shield layer; and fabricating a second electrode portion on the first insulating layer, the second electrode portion forming part of the electrode and connecting the first electrode portion to the magnetoresistive element. In this case, the second electrode portion may be formed in a region greater than a region where the first electrode portion is formed.

The method may farther include the step of forming an induction-type magnetic transducer for writing. The transducer includes: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

The method may further include the step of forming an electrode shield layer for shielding the at least part of the electrode. In this case, the method may further include the step of forming an induction-type magnetic transducer for writing. The transducer includes: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers. In the step of forming the electrode shield layer, the electrode shield layer may be formed at the same time as one of the magnetic layers of the magnetic transducer.

According to the method, at least part of the electrode may be formed through plating. One of the shield layers may be formed through plating.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 8A and FIG. 8B are cross sections for illustrating a step that follows FIG. 7A and FIG. 7B.

FIG. 12A and FIG. 12B are cross sections for illustrating a step in a method of manufacturing a thin-film magnetic head of a third embodiment of the invention.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

FIG. 15A and FIG. 15B are cross sections for illustrating a step that follows FIG. 14A and FIG. 14B.

FIG. 16A and FIG. 16B are cross sections for illustrating a step that follows FIG. 15A and FIG. 15B.

FIG. 17A and FIG. 17B are cross sections for illustrating a step that follows FIG. 16A and FIG. 16B.

FIG. 18A and FIG. 18B are cross sections for illustrating a step that follows FIG. 17A and FIG. 17B.

FIG. 19A and FIG. 19B are cross sections for illustrating a step that follows FIG. 18A and FIG. 18B.

FIG. 26A and FIG. 26B are cross sections for illustrating a step that follows FIG. 25A and FIG. 25B.

FIG. 27A and FIG. 27B are cross sections for illustrating a step that follows FIG. 26A and FIG. 26B.

FIG. 28A and FIG. 28B are cross sections for illustrating a step that follows FIG. 27A and FIG. 27B.

FIG. 29A and FIG. 29B are cross sections for illustrating a step that follows FIG. 28A and FIG. 28B.

DETAILED DESCRIPTION OF THE PREFERRED EMBODIMENTS

[First Embodiment]

Figure 9:
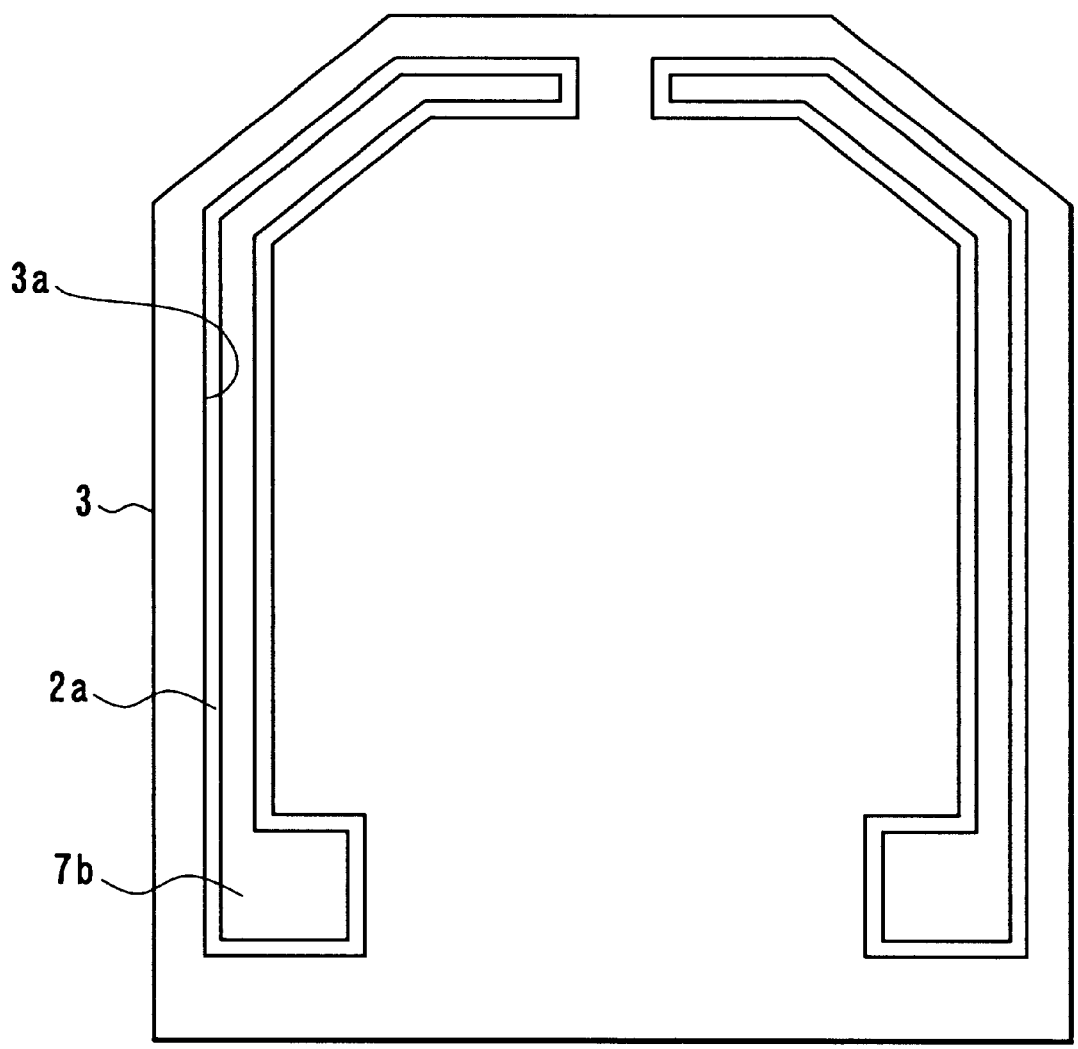
FIG. 9 is a top view of FIG. 3A and FIG. 3B.

Preferred embodiments of the invention will now be described in detail with reference to the accompanying drawings. Reference is now made to FIG. 1A to FIG. 8A, FIG. 1B to FIG. 8B, FIG. 9 and FIG. 10 to describe a method of manufacturing a composite thin-film magnetic head as a method of manufacturing a thin-film magnetic head of a first embodiment of the invention. FIG. 1A to FIG. 8A are cross sections each orthogonal to the air bearing surface of the thin-film magnetic head. FIG. 1B to FIG. 8B are cross sections each parallel to the air bearing surface of the pole portion of the head.

In the method of the embodiment, as shown in FIG. 1A and FIG. 1B, an insulating layer 2 made of alumina ($Al_2O_3$), for example, of about 5 μm in thickness is deposited on a substrate 1 made of aluminum oxide and titanium carbide ($Al_2O_3$—TiC), for example.

Next, as shown in FIG. 2A and FIG. 2B, a pair of conductive layers 7b made of copper (Cu), for example, and having a thickness of about 2 to 3 μm are selectively formed on the insulating layer 2. The conductive layers 7b are to be an electrode (lead) connected to the MR element. Next, an insulating film 2a of alumina, for example, whose thickness is 0.3 to 1.0 μm is formed over the entire surface. On the insulating film 2a, a magnetic material such as Permalloy (NiFe) is deposited to a thickness of about 2 to 3 μm through plating to form a magnetic layer 3A. The magnetic layer 3A is thus formed so as to surround the conductive layers 7b, the insulating film 2a being placed between the conductive layers 7b and the magnetic layer 3A. The magnetic layer 3A corresponds to a layer for shielding of the invention.

Next, although not shown, an insulating layer made of alumina, for example, and having a thickness of 3 to 4 μm is formed over the entire surface of the magnetic layer 3A. The insulating layer is polished to the surface of the conductive layers 7b and flattened. The polishing method may be mechanical polishing or chemical mechanical polishing (CMP). Through this flattening process, as shown in FIG. 3A and FIG. 3B, a structure is obtained in which the magnetic layer 3A becomes a bottom shield layer 3 and, in grooves 3a thus formed in the bottom shield layer 3, the conductive layers 7b are formed in a self-aligned manner, the insulating film 2a being placed between the grooves 3a and the conductive layers 7b.

As thus described, the conductive layers 7b are formed to be precisely embedded in a self-aligned manner in the grooves 3a of bottom shield layer 3 fully covered with the insulating film 2a whose thickness is 0.3 to 1.0 μm. As a result, an extremely high insulation property is obtained between the conductive layers 7b and the bottom shield layer 3. It is therefore possible to prevent magnetic and electrical insulation faults between the conductive layers 7b and the bottom shield layer 3 due to particles or pinholes in the layers.

Next, as shown in FIG. 4A and FIG. 4B, an insulating material such as aluminum nitride or alumina is sputtered to a thickness of about 40 to 100 nm over the bottom shield layer 3 and the conductive layers 7b. A bottom shield gap film 4 as an insulating layer is thus formed. Before forming the bottom shield gap film 4, a photoresist pattern in a T-shape, for example, is formed to facilitate liftoff where contact holes are to be formed for electrically connecting the conductive layers 7b to electrode layers described later. After the bottom shield gap film 4 is formed, the contact holes are formed through lifting off the photoresist pattern. Alternatively, the contact holes may be formed by selectively etching the bottom shield gap film 4 through the use of photolithography.

Next, an MR film of tens of nanometers in thickness for forming an MR element 5 for reproduction is deposited through sputtering on the bottom shield gap film 4. A photoresist pattern (not shown) is then selectively formed where the MR element 5 is to be formed on the MR film. The photoresist pattern is T-shaped, for example, to facilitate liftoff. Next, the MR film is etched through argon-base ion milling, for example, with the photoresist pattern as a mask to form the MR element 5. The MR element 5 may be either a GMR element or an AMR element.

Next, on the bottom shield gap film 4, a pair of electrode layers 7a having a thickness of 80 to 150 nm are formed through sputtering with the same photoresist pattern as a mask. The electrode layers 7a are to be electrically connected to the MR element 5. The electrode layers 7a may be formed through stacking TiW, CoPt, TiW, Ta, and Au, for example. The electrode layers 7a are electrically connected to the conductive layers 7b through the contact holes provided in the bottom shield gap film 4. The electrode layers 7a and the conductive layers 7b make up the electrode connected to the MR element 5. The conductive layers 7b correspond to a first electrode portion of the invention. The electrode layers 7a correspond to a second electrode portion of the invention.

Next, on the bottom shield gap film 4, the MR element 5 and the electrode layers 7a, an insulating material such as aluminum nitride or alumina is sputtered to a thickness of about 50 to 100 nm to form a top shield gap film 8 as an insulating layer. The MR element 5 is thus embedded in the shield gap films 4 and 8.

Next, a top shield layer-cum-bottom pole layer (called a top shield layer in the following description) 9 made of a magnetic material is formed on the top shield gap film 8. The top shield layer 9 is used for both reproducing and recording heads. The top shield layer 9 may be made of NiFe or a high saturation flux density material such as FeN or a compound thereof or an amorphous of Fe—Co—Zr. The top shield layer 9 may be made of layers of NiFe and a high saturation flux density material.

Next, an alumina film or a silicon dioxide film having a thickness of 4 to 6 μm is formed over the entire surface. The entire surface is then flattened so that the surface of the top shield layer 9 is exposed. The flattening may be performed through mechanical polishing or CMP. Such a flattening process prevents formation of a rise in the top shield layer 9 caused by the pattern of the MR element 5. The surface of the top shield layer 9 is thus made flat, and the recording gap layer of the magnetic pole portion of the recording head to be formed is made flat. As a result, the writing property in a high frequency range is improved.

Next, as shown in FIG. 5A and FIG. 5B, a recording gap layer 10 made of an insulating film of alumina, for example, and having a thickness of 0.2 to 0.3 μm is formed on the flattened top shield layer 9. A portion of the recording gap layer 10 is then etched to form a contact hole 11 for making a magnetic path.

Next, an insulating film of alumina or silicon dioxide having a thickness of 0.8 to 1.4 μm is formed on the recording gap layer 10. The insulating film is then selectively etched through photolithography to form an insulating layer 12 that defines the throat height. A taper is formed in the edge on the pole-portion-side of the insulating layer 12. The tapered edge defines the throat height.

Next, on the insulating layer 12, a thin-film coil 13 of a first layer for the recording head is formed through plating, for example, whose thickness is 2 to 3 μm.

Next, as shown in FIG. 6A and FIG. 6B, an insulating layer 14 made of photoresist is formed into a specific pattern on the insulating layer 12 and the coil 13. Next, a thin-film coil 15 of a second layer whose thickness is 2 to 3 μm is formed on the insulating layer 14. An insulating layer 16 made of photoresist is formed into a specific pattern on the insulating layer 14 and the coil 15. Next, the entire structure is cured at a temperature in the range between 200 to 250° C., such as about 200° C.

Next, as shown in FIG. 7A and FIG. 7B, a top pole layer 17 whose thickness is about 3 μm is formed to cover the recording gap layer 10 in the pole portion, the insulating layers 12, 14 and 16 and the contact hole 11. The top pole layer 17 is made of a magnetic material for the recording head. The top pole layer 17 is in contact with and magnetically coupled to the top shield layer 9 through the contact hole 11. The top pole layer 17 may be formed through plating with NiFe (80 weight % Ni and 20 weight % Fe) or a high saturation flux density material such as NiFe (50 weight % Ni and 50 weight % Fe), or through sputtering a high saturation flux density material such as FeN or a compound thereof and then patterning. Besides the above examples, the material of the top pole layer 17 may be a high saturation flux density material such as an amorphous of Fe—Co—Zr. Alternatively, the top pole layer 17 may be layers of two or more of the above materials. The top pole layer 17 made of a high saturation flux density material allows the magnetic flux generated by the coils 13 and 15 to effectively reach the pole portion without saturating before reaching the pole. A recording head that achieves high recording density is therefore obtained.

Next, as shown in FIG. 8A and FIG. 8B, part of the recording gap layer 10 in the pole portion on both sides of the top pole layer 17 is removed through dry etching. The exposed top shield layer 9 is then etched through ion milling by about 0.4 μm, for example, with the top pole layer 17 as a mask so as to form a trim structure. Next, an overcoat layer 18 of alumina, for example, is formed to cover the top pole layer 17. Finally, machine processing of the slider is performed and the air bearing surfaces of the recording head and the reproducing head are formed. The thin-film magnetic head is thus completed.

The top shield layer (bottom pole layer) 9, the recording gap layer 10, the top pole layer 17, and the thin-film coils 13 and 15 correspond to an induction-type magnetic transducer of the invention.

Figure 10:
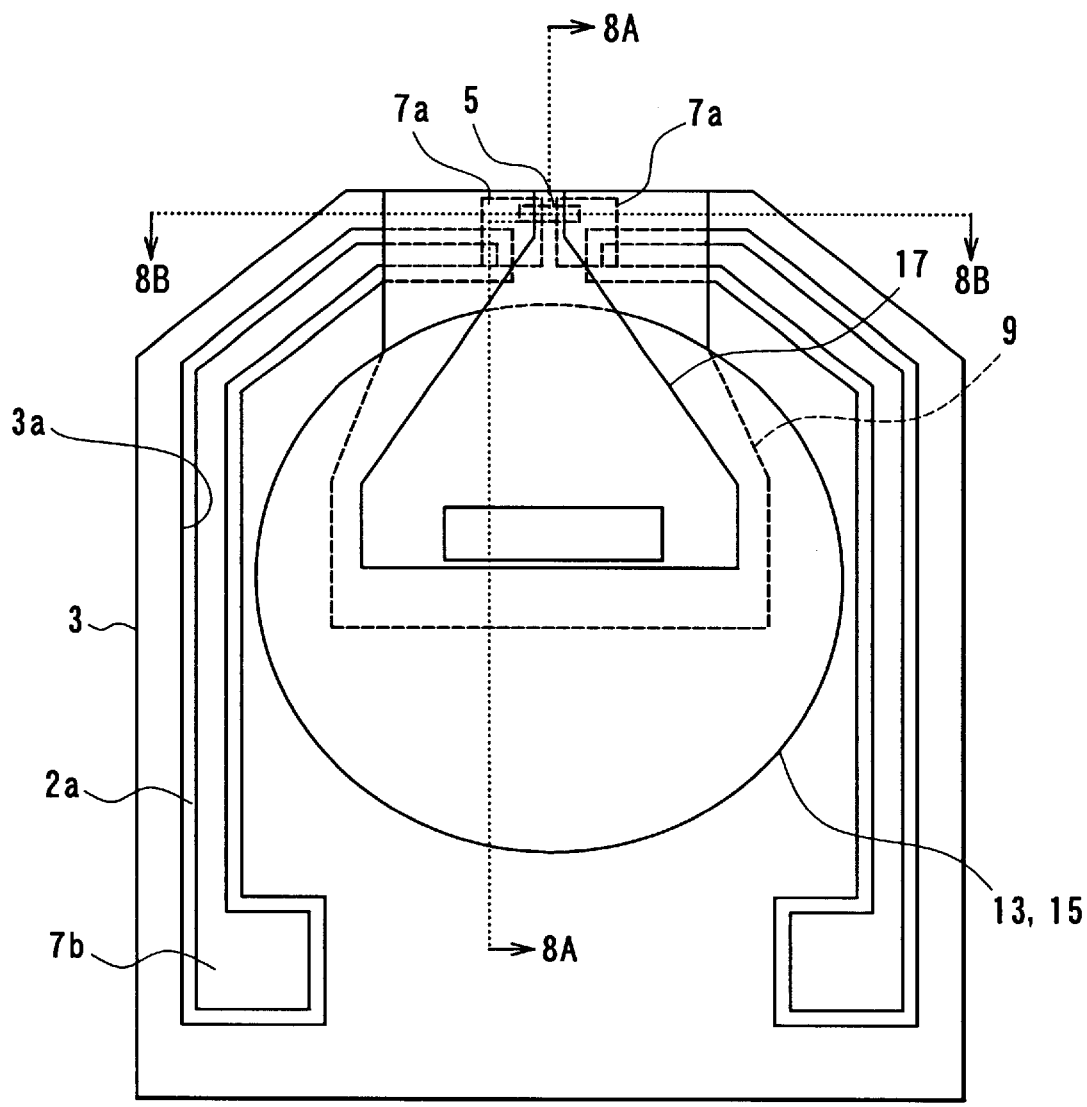
FIG. 10 is a top view of FIG. 8A and FIG. 8B.

FIG. 9 is a top view of FIG. 3A and FIG. 3B. FIG. 10 is a top view of FIG. 8A and FIG. 8B. The overcoat layer 18 is omitted in FIG. 10. FIG. 10 shows the state before mechanical processing of the slider is performed. FIG. 1A to FIG. 8A are cross sections taken along line 8A—8A of FIG. 10. FIG. 1B to FIG. 8B are cross sections taken along line 8B—8B of FIG. 10. As shown in the drawings, the bottom shield layer 3 is placed in a range including a region facing the two magnetic layers (the top shield layer 9 and the top pole layer 17) and the thin-film coils 13 and 15 of the induction-type magnetic transducer. The grooves 3a of the bottom shield layer S extend from the positions near both ends of the MR element 5 to both sides of the MR element 5. Part of the grooves 3a passes through the region facing the top shield layer 9. Most of the remaining part is placed around the region facing the two magnetic layers and the coils 13 and 15 of the induction-type magnetic transducer. The conductive layers 7b making up the electrode connected to the MR element 5 are embedded in the grooves 3a of the bottom shield layer 3, being insulated by the insulating film 2a. Therefore, the conductive layers 7b extend from the positions near both ends of the MR element 5 to both sides of the MR element 5. Part of the conductive layers 7b passes through the region facing the top shield layer 9. Most of the remaining part is placed around the region facing the two magnetic layers and the coils 13 and 15 of the induction-type magnetic transducer. The ends of the grooves 3a and the conductive layers 5 opposite to the MR element 5 are greater in width than the other portions.

According to the embodiment thus described, the pair of conductive layers 7b to be the electrode (lead) connected to the MR element are formed on the insulating layer 2. The magnetic layer 3A is formed on the insulating layer 2 and the conductive layers 7b, the insulating film 2a being placed between the magnetic layer 3A and the insulating layer 2 and the conductive layers 7b. The magnetic layer 3A is flattened to form the bottom shield layer 3 and the conductive layers 7b placed in the grooves 3a of the bottom shield layer 3. As a result, according to the embodiment of the invention, an extremely high insulation property is achieved between the conductive layers 7b and the bottom shield layer 3. It is therefore possible to prevent magnetic and electrical insulation faults between the conductive layers 7b and the bottom shield layer 3.

Part of the conductive layers 7b faces the top shield layer 9 with the bottom shield gap film 4 and the top shield gap film 8 in between. However, the most part of the conductive layers 7b does not face the top shield layer 9. As a result, the insulation property is extremely high between the conductive layers 7b and the top shield layer 9, too. It is therefore possible to prevent magnetic and electrical insulation faults between the conductive layers 7b and the top shield layer 9.

According to the embodiment, the conductive layers 7b are not inserted between the bottom shield gap film 4 and the top shield gap film 8. As a result, it is impossible that large areas of the conductive layers 7b face the bottom shield layer 3 and the top shield layer 9 with the bottom shield gap film 4 and the top shield gap film 8 in between. Therefore, although the bottom shield gap film 4 and the top shield gap film 8 are made thin, the insulation property is maintained at a high level between the conductive layers 7b and the bottom shield layer 3 and between the conductive layers 7b and the top shield layer 9.

According to the embodiment described so far, the insulation property is improved between the electrode connected to the MR element 5 and the bottom shield layer 3 and between the electrode and the top shield layer 9 without increasing the thickness of the bottom shield gap film 4 and the top shield gap film 8.

According to the embodiment, the bottom shield gap film 4 and the top shield gap film 8 are made thin enough to improve the thermal asperity. The property of the reproducing head is thereby improved.

According to the embodiment, the conductive layers 7b are made thick enough so that the wiring resistance of the electrode connected to the MR element 5 is made lower. As a result, it is possible to detect with sensitivity a minute change in the output signal corresponding to a minute change in resistance of the MR element 5. The property of the reproducing head is improved in this respect, too.

In the embodiment, lateral surfaces of part of the conductive layers 7b placed in the grooves 3a of the bottom shield layer 3 are shielded, being placed in the middle of the bottom shield layer 3 along the direction of length. As a result, it is possible to reduce the effects of noises caused by internal factors such as magnetism generated by the coil of the induction-type recording head or external factors such as the motor of the hard disk drive. In the neighborhood of the MR element 5, in particular, both sides of the conductive layers 7b are shielded by the bottom shield layer 3, and the top surfaces of the conductive layers 7b are shielded by the top shield layer 9. The effects of noises on the MR element 5 connected to the conductive layers 7b through the electrode layers 7a are thereby reduced. The property of the reproducing head is improved in this respect, too.

[Second Embodiment]

Figure 11:
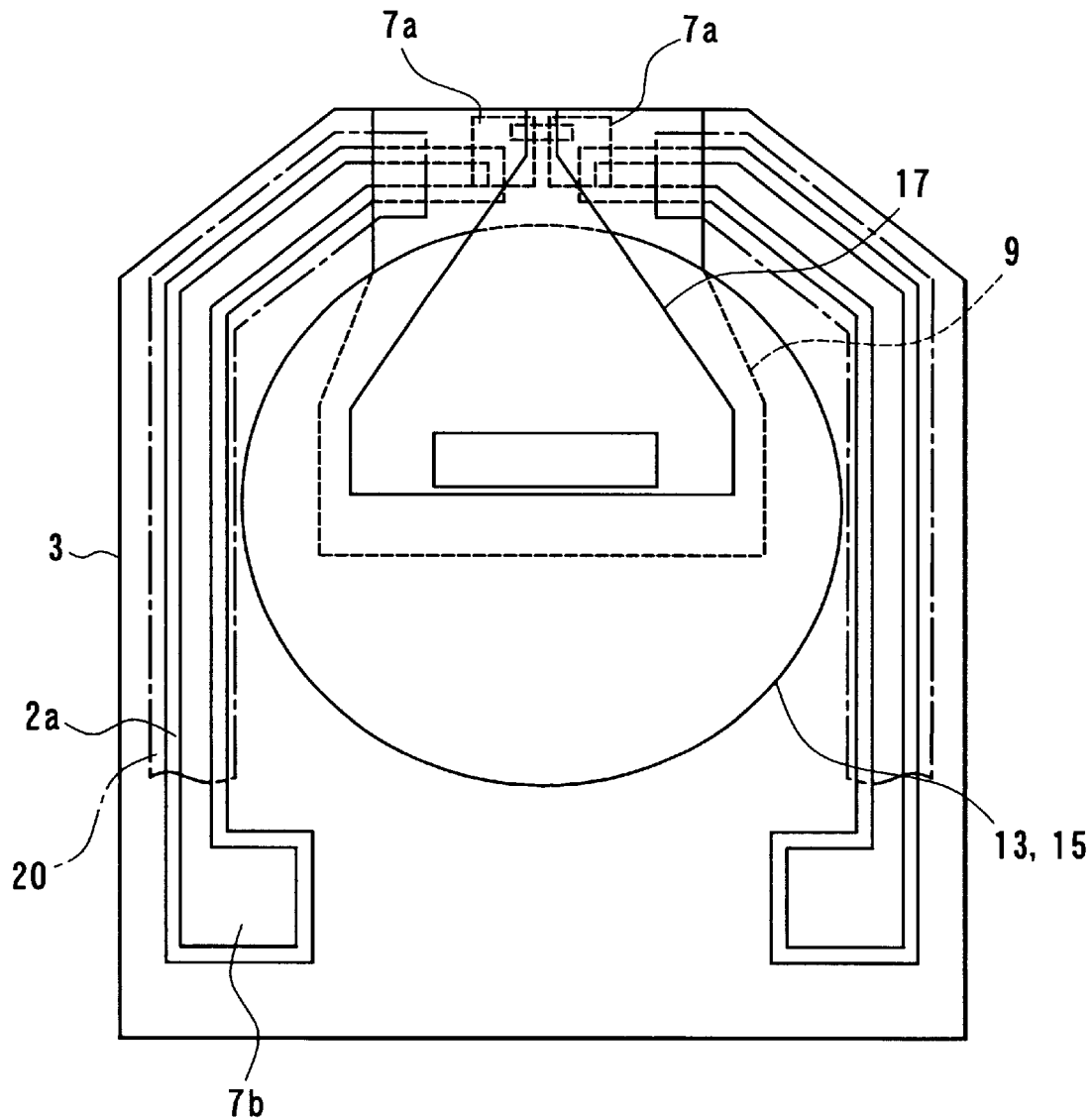
FIG. 11 is a top view of a thin-film magnetic head manufactured through a method of a second embodiment of the invention.

Reference is now made to FIG. 11 to describe a second embodiment of the invention. FIG. 11 is a top view of a thin-film magnetic head manufactured through a method of the embodiment. The overcoat layer is omitted in FIG. 11. FIG. 11 shows the state before mechanical processing of the slider is performed.

In this embodiment, electrode shield layers 20 are provided. The shield layers 20 face the portions of the conductive layers 7b in the grooves 3a of the bottom shield layer 3 that are exposed from the grooves 3a. The shield layers 20 cover at least portions of the conductive layers 7b in the grooves 3a that do not face the top shield layer 9.

In the step of making the top pole layer 17, the shield layers 20 may be formed at the same time through the use of the same magnetic material.

According to the embodiment, the shield layers 20 shield the top surfaces of the portions of the conductive layers 7b in the grooves 3a that do not face the top shield layer 9. As a result, the effects of noises on the MR element 5 connected to the conductive layers 7b through the electrode layers 7a are more greatly reduced, compared to the first embodiment.

The remainder of configuration, functions and effects of the embodiment are similar to those of the first embodiment.

[Third Embodiment]

Reference is now made to FIG. 12A to FIG. 19A, FIG. 12B to FIG. 19B, FIG. 20 and FIG. 21 to describe a method of manufacturing a composite thin-film magnetic head as a method of manufacturing a thin-film magnetic head of a third embodiment of the invention. FIG. 12A to FIG. 19A are cross sections each orthogonal to the air bearing surface of the thin-film magnetic head. FIG. 12B to FIG. 19B are cross sections each parallel to the air bearing surface of the pole portion of the head.

In the method of the embodiment, as shown in FIG. 12A and FIG. 12B, the insulating layer 2 made of alumina ($Al_2O_3$), for example, of about 5 μm in thickness is deposited on the substrate 1 made of aluminum oxide and titanium carbide ($Al_2O_3$—TiC), for example.

Next, a pair of conductive layers 7b made of copper (Cu), for example, and having a thickness of about 2 to 3 μm are selectively formed on the insulating layer 2. The conductive layers 7b are to be an electrode (lead) connected to the MR element. Next, the insulating film 2a of alumina, for example, whose thickness is 0.3 to 1.0 μm is formed over the entire surface. On the insulating film 2a, a magnetic material such as Permalloy (NiFe) is deposited to a thickness of about 2 to 3 μm through plating to form the magnetic layer 3A.

Next, although not shown, an insulating layer made of alumina, for example, and having a thickness of 3 to 4 μm is formed over the entire surface of the magnetic layer 3A. The insulating layer is polished to the surface of the conductive layers 7b and flattened. The polishing method may be mechanical polishing or CMP. Through this flattening process, as shown in FIG. 13A and FIG. 13B, a structure is obtained in which the magnetic layer 3A becomes the bottom shield layer 3 and, in the grooves 3a thus formed in the bottom shield layer 3, the conductive layers 7b are formed in a self-aligned manner, the insulating film 2a being placed between the grooves 3a and the conductive layers 7b. In this manner, the conductive layers 7b are formed to be precisely embedded in a self-aligned manner in the grooves 3a of bottom shield layer 3 fully covered with the insulating film 2a whose thickness is 0.3 to 1.0 μm.

Next, as shown in FIG. 14A and FIG. 14B, an insulating material such as aluminum nitride or alumina is sputtered to a thickness of about 50 to 100 nm over the bottom shield layer 3 and the conductive layers 7b. A first bottom shield gap film 4a is thus formed. Before forming the bottom shield gap film 4a, contact holes are formed for electrically connecting the conductive layers 7b to electrode layers described later. Next, on a portion of the first bottom shield gap film 4a on a side of the contact hole opposite to the pole portion, an insulating material such as aluminum nitride or alumina is deposited to a thickness of 0.1 to 0.3 μm to form a second bottom shield gap film 4b.

Next, an MR film of tens of nanometers in thickness for forming the MR element 5 for reproduction is deposited through sputtering on the first bottom shield gap film 4a. A photoresist pattern (not shown) is then selectively formed where the MR element 5 is to be formed on the MR film. The photoresist pattern is T-shaped, for example, to facilitate liftoff. Next, the MR film is etched through argon-base ion milling, for example, with the photoresist pattern as a mask to form the MR element 5. The MR element 5 may be either a GMR element or an AMR element.

Next, on the first bottom shield gap film 4a, the conductive layers 7b and the second bottom shield gap film 4b, a pair of electrode layers 7a having a thickness of 80 to 150 nm are formed through sputtering with the same photoresist pattern as a mask. The electrode layers 7a are to be electrically connected to the MR element 5. The electrode layers 7a may be formed through stacking TiW, CoPt, TiW, Ta, and Au, for example. The electrode layers 7a are electrically connected to the conductive layers 7b through the contact holes provided in the first bottom shield gap film 4a. The electrode layers 7a and the conductive layers 7b make up the electrode connected to the MR element 5. In this embodiment part of the electrode layers 7a is formed on the second bottom shield gap film 4b, too.

Next, as shown in FIG. 15A and FIG. 15B, on the electrode layers 7a, an insulating material such as aluminum nitride or alumina is sputtered to a thickness of about 50 to 100 nm to form a first top shield gap film 8a. Next, on the MR element 5 and the first top shield gap film 8a, an insulating material such as aluminum nitride or alumina is sputtered to a thickness of 0.1 to 0.3 µm to form a second top shield gap film 8b. The MR element 5 is thus embedded in the shield gap films 4a and 8b.

Next, as shown in FIG. 16A and FIG. 16B, the top shield layer-cum-bottom pole layer (called a top shield layer in the following description) 9 made of a magnetic material and having a thickness of 1 to 2 µm is formed on the second top shield gap film 8b. The top shield layer 9 is used for both reproducing and recording heads. The top shield layer 9 may be made of NiFe or a high saturation flux density material such as FeN or a compound thereof or an amorphous of Fe—Co—Zr. The top shield layer 9 may be made of layers of NiFe and a high saturation flux density material.

Next, as shown in FIG. 17A and FIG. 17B, on a portion of the top shield layer 9 in the pole portion, a bottom pole tip 21 made of NiFe or a high saturation flux density material as mentioned above and having a thickness of 1.5 to 2.5 µm is formed. On a portion of the top shield layer 9 where the top and bottom pole layers are connected to each other, a magnetic layer 22 made of a material the same as that of the bottom pole tip 21 and having a thickness of 1.5 to 2.5 µm is formed for making a magnetic path.

Next, an insulating film 23 made of an alumina film or a silicon dioxide film having a thickness of 4 to 6 µm is formed over the entire surface. The entire surface is then flattened so that the surfaces of the bottom pole tip 21 and the magnetic layer 22 are exposed. The flattening may be performed through mechanical polishing or CMP. Such a flattening process prevents formation of a rise in the top shield layer 9 and the bottom pole tip 21 caused by the pattern of the MR element 5. The surface of the bottom pole tip 21 is thus made flat, and the recording gap layer of the magnetic pole portion of the recording head to be formed is made flat. As a result, the writing property in a high frequency range is improved.

Next, as shown in FIG. 18A and FIG. 18B, a recording gap layer 30 made of an insulating film of alumina, for example, and having a thickness of 0.2 to 0.3 µm is formed on the bottom pole tip 21 and the insulating film 23. Next, on a portion of the recording gap layer 30 in the pole portion, a top pole tip 31 made of a magnetic material and having a thickness of 3 µm, for example, is formed for the recording head. The top pole tip 31 defines the track width of the recording head. On the magnetic layer 22, a magnetic layer 32 made of a material the same as that of the top pole tip 31 and having a thickness of 3 µm, for example, is formed for making the magnetic path. The top pole tip 31 may be formed through plating with NiFe (80 weight % Ni and 20 weight % Fe) or a high saturation flux density material such as NiFe (50 weight % Ni and 50 weight % Fe), or through sputtering a high saturation flux density material such as FeN or a compound thereof and then patterning. Besides the above examples, the material of the top pole tip 31 may be a high saturation flux density material such as an amorphous of Fe—Co—Zr. Alternatively, the top pole tip 31 may be layers of two or more of the above materials. The top pole tip 31 made of a high saturation flux density material allows the magnetic flux generated by coils to effectively reach the pole portion without saturating before reaching the pole. A recording head that achieves high recording density is therefore obtained.

Next, part of the recording gap layer 30 in the pole portion on both sides of the top pole tip 31 is removed through dry etching. The exposed bottom pole tip 21 is then etched through ion milling by about 0.4 µm, for example, with the top pole tip 31 as a mask so as to form a trim structure.

Next, on the recording gap layer 30, a thin-film coil 33 of a first layer for the recording head is formed through plating, for example, whose thickness is 1.5 to 2.5 µm.

Next, as shown in FIG. 19A and FIG. 19B, an insulating layer 34 made of an alumina film or a silicon dioxide film, for example, and having a thickness of 4 to 6 µm is formed over the entire surface. The entire surface is then flattened so that the surfaces of the top pole tip 31 and the magnetic layer 32 are exposed. This flattening process may be performed through mechanical polishing or CMP.

Next, a thin-film coil 35 of a second layer whose thickness is 1.5 to 2.5 µm is formed on the insulating layer 34. An insulating layer 36 made of photoresist is formed into a specific pattern on the insulating layer 34 and the coil 35. Next, the entire structure is cured at a temperature in the range between 200 to 250° C., such as about 200° C.

Next, a top pole layer 37 made of a magnetic material whose thickness is about 3 to 4 µm is formed for the recording head to cover the top pole tip 31, the magnetic layer 32, and the insulating layer 36. Next, an overcoat layer 38 of alumina, for example, is formed to cover the top pole layer 37. Finally, machine processing of the slider is performed and the air bearing surfaces of the recording head and the reproducing head are formed. The thin-film magnetic head is thus completed.

Figure 20:
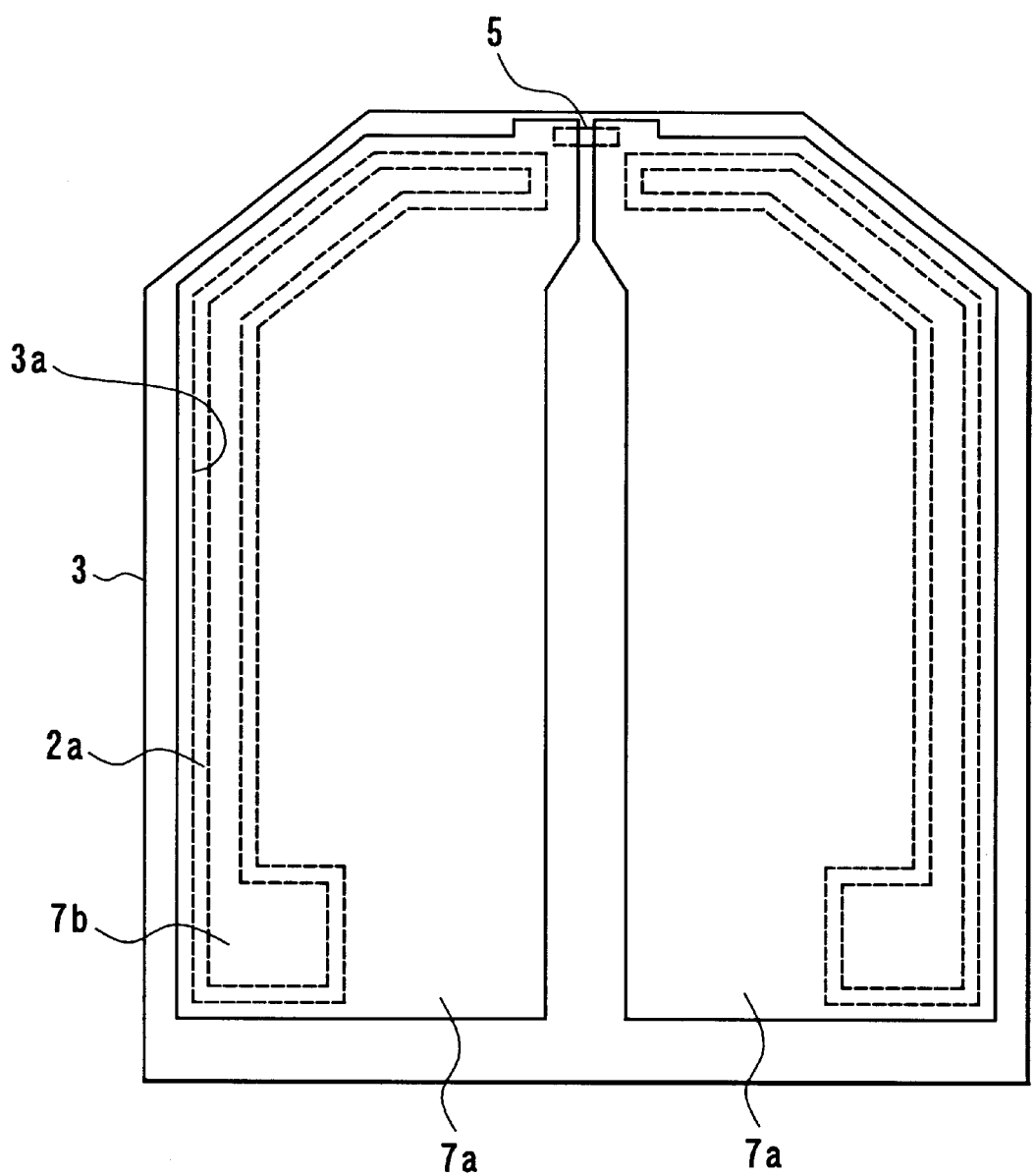
FIG. 20 is a top view of FIG. 14A and FIG. 14B.
Figure 21:
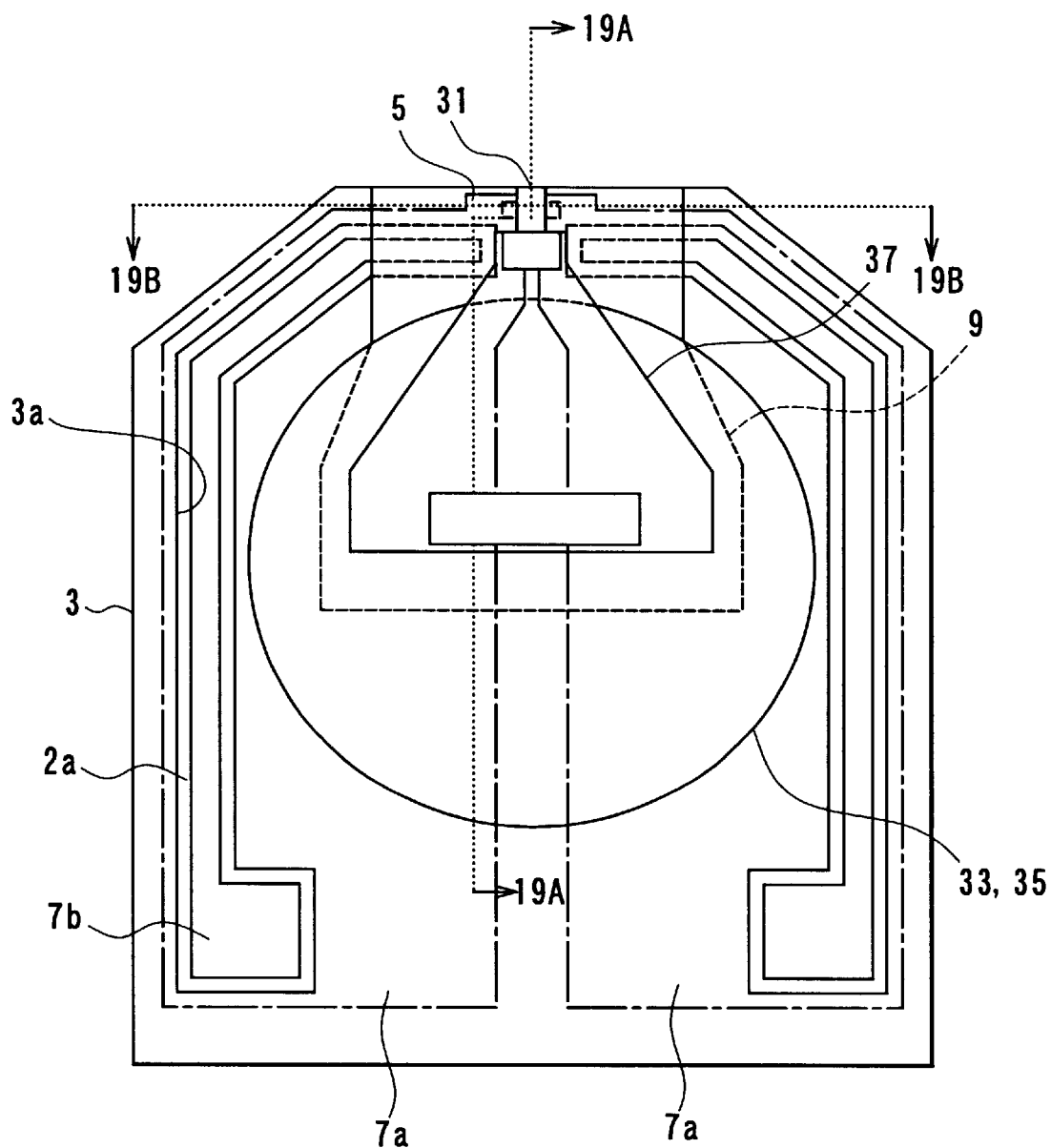
FIG. 21 is a top view of FIG. 19A and FIG. 19B.
Figure 22A:
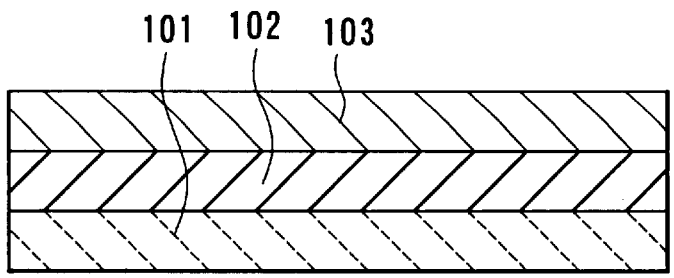
FIG. 22A and FIG. 22B are cross sections for illustrating a step in a method of manufacturing a thin-film magnetic head of related art.
Figure 22B:
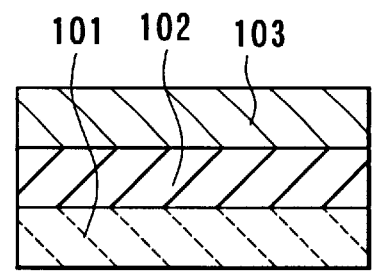
Figure 23A:
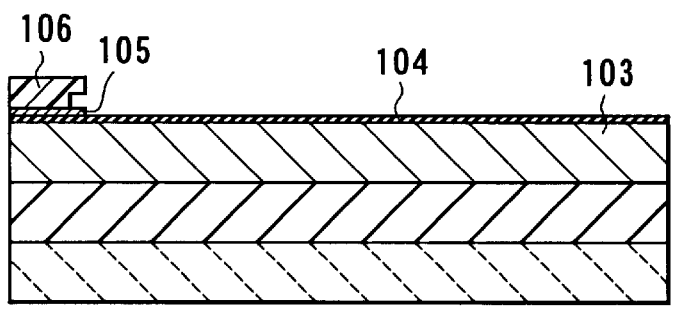
FIG. 23A and FIG. 23B are cross sections for illustrating a step that follows FIG. 22A and FIG. 22B.
Figure 23B:
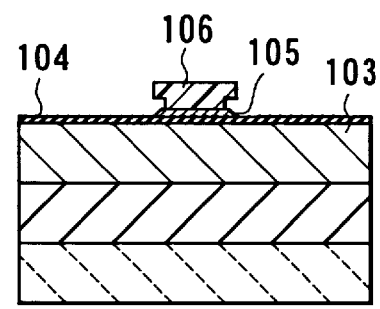
Figure 24A:
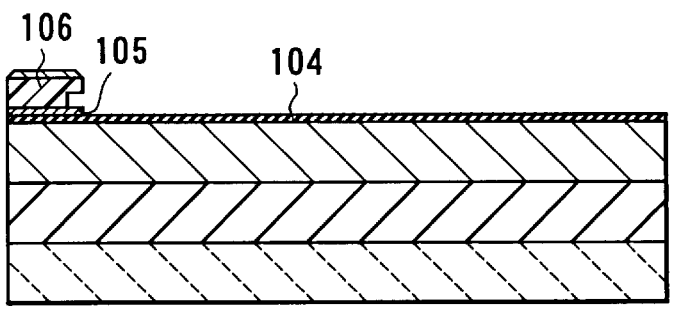
FIG. 24A and FIG. 24B are cross sections for illustrating a step that follows FIG. 23A and FIG. 23B.
Figure 24B:
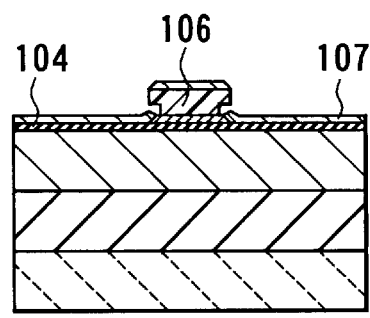
Figure 25A:
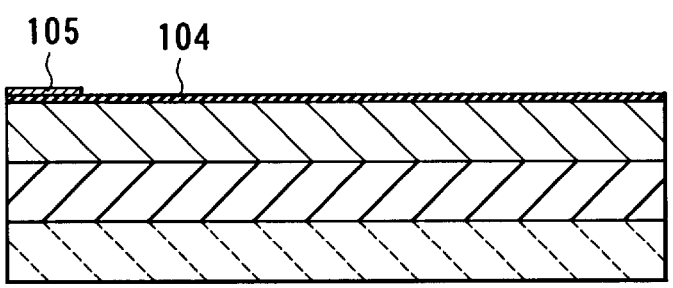
FIG. 25A and FIG. 25B are cross sections for illustrating a step that follows FIG. 24A and FIG. 24B.
Figure 25B:
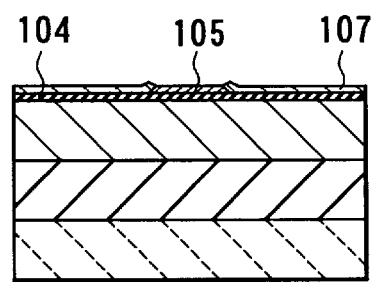
Figure 30:
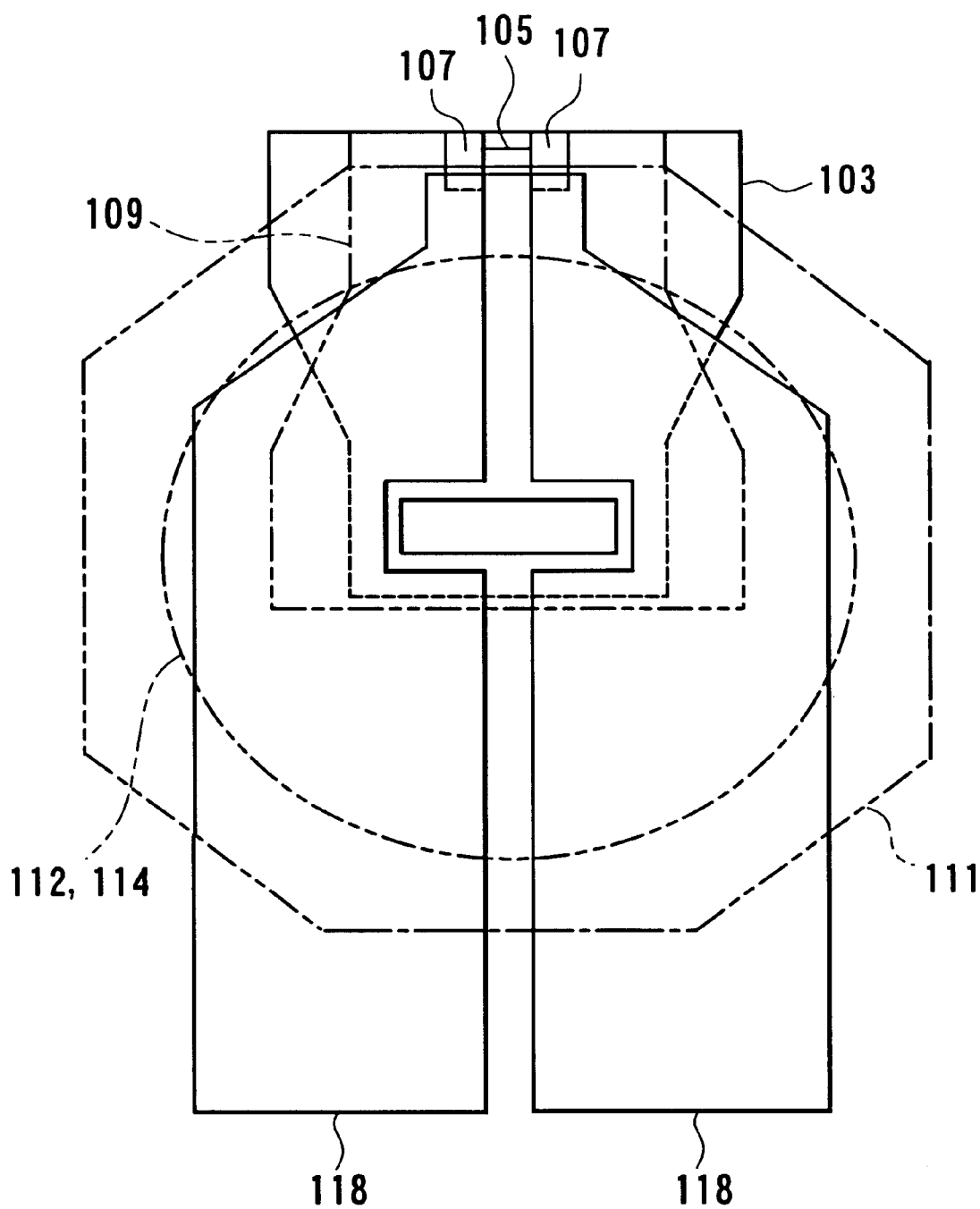
FIG. 30 is a top view of the related-art thin-film magnetic head in the state in one of the manufacturing steps.
Figure 31:
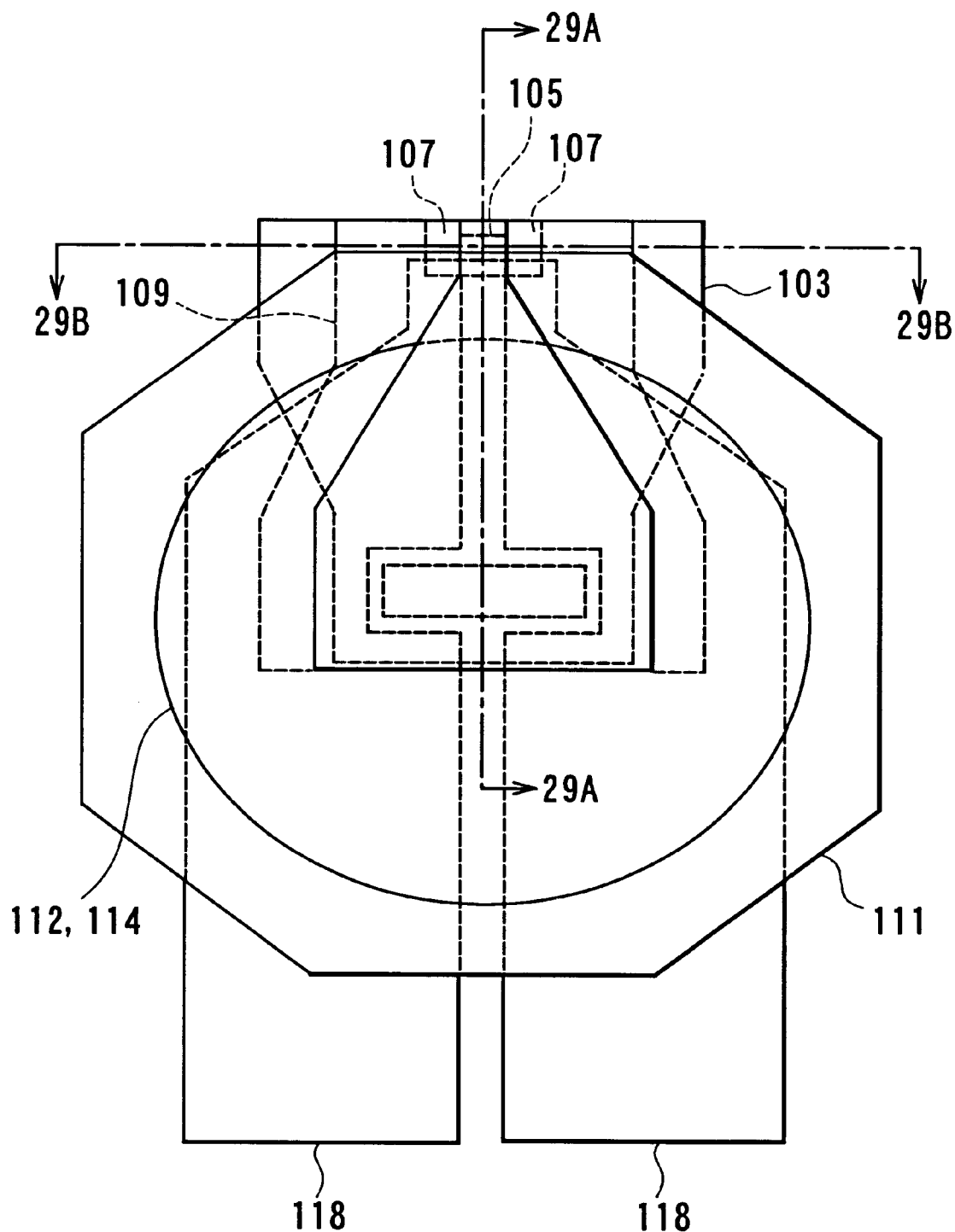
FIG. 31 is a top view of the related-art thin-film magnetic head.

FIG. 20 is a top view of FIG. 14A and FIG. 14B. FIG. 21 is a top view of FIG. 19A and FIG. 19B. The overcoat layer 38 is omitted in FIG. 21. FIG. 21 shows the state before mechanical processing of the slider is performed. FIG. 12A to FIG. 19A are cross sections taken along line 19A—19A of FIG. 21. FIG. 12B to FIG. 19B are cross sections taken along line 19B—19B of FIG. 21. In this embodiment, as shown in the drawings, the electrode layers 7a are placed in a wide range including a region facing the two magnetic layers (the top shield layer 9 and the top pole layer 37) and the thin-film coils 33 and 35 of the induction-type magnetic transducer. That is, the electrode layers 7a are formed in the region greater than the region where the conductive layers 7b are formed.

It is required to pay close attention in order to maintain optimal characteristics of recording and reproduction at high density of 20 GB per square inch or above. One of the factors that reduce the characteristics is the effect of noises on the MR element 5. If the structure is such that the conductive layers 7b form part of a ring, the conductive layers 7b may function as part of the coil and carry noises. However, in this embodiment, the electrode layers 7a connected to the conductive layers 7b are placed in the wide range. It is therefore impossible that the electrode made up of the conductive layers 7b and the electrode layers 7a forms part of a ring. As a result, it is possible to prevent the conductive layers 7b and the electrode layers 7a from receiving noises. The effect of noises on the MR element 5 is therefore reduced.

The remainder of configuration, functions and effects of the embodiment are similar to those of the first embodiment.

The present invention is not limited to the foregoing embodiments. For example, in the foregoing embodiments, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

In the thin-film magnetic head having such a structure, the top shield layer of the MR element corresponds to one of the shield layers of the invention. That is, the conductive layers are placed in the grooves of the top shield layer.

A base body having a concavity is preferred for the thin-film magnetic head having such a structure. If the coils are formed in the concavity of the base body, the thin-film magnetic is further reduced in size.

Alternatively, the insulating layers formed between the thin-film coils forming the coils of the induction-type magnetic transducer may be all made of inorganic layers.

According to the method of manufacturing a thin-film magnetic head of the invention thus described, at least part of the electrode is formed, and then one of the shield layers is formed so as to surround at least part of the electrode, an insulating film being placed between the electrode and the one of the shield layers. At least part of the electrode is thereby insulated and placed in the groove of the one of the shield layers. As a result, a high insulation property is obtained between the electrode and each of the shield layers. Since the electrode is not inserted between the shield layers with an insulating layer in between, an insulation property is improved between each of the shield layers and the electrode connected to the magnetoresistive element without increasing the thickness of the insulating layer between each of the shield layers and the magnetoresistive element. In addition, the wiring resistance of the electrode is more reduced since the electrode is made thick enough. Furthermore, the effect of noises on the electrode is reduced since part of the electrode in the grooves is placed between one of the shield layers and shielded.

According to the invention, the effect of noises from an external source is further reduced if the following method is taken. That is, the first electrode portion forming part of the electrode is formed, and the shield layer to be the first shield layer is formed to surround the first electrode portion while the insulating film is placed between the first electrode portion and the shield layer. The shield layer is flattened so that the first electrode portion is exposed to form the first shield layer. The first insulating layer is formed on the first shield layer. The second electrode portion is formed on the first insulating layer. The second electrode portion forms part of the electrode and connects the first electrode portion to the magnetoresistive element. The electrode, the first shield layer and the first insulating layer are thus formed. The second electrode portion is formed in the region greater than the region where the first electrode portion.

If the shield layer is provided for shielding at least part of the electrode, the effect of noises on the electrode is further reduced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising:

a magnetoresistive element; a first shield layer and a second shield layer for shielding the magnetoresistive element, the first shield layer and the second shield layer facing each other with the magnetoresistive element in between;

a first insulating layer provided between the magnetoresistive element and the first shield layer and a second insulating layer provided between the magnetoresistive element and the second shield layer; and an electrode connected to the magnetoresistive element; one of the first and second shield layers having a groove in which at least part of the electrode is placed; the at least part of the electrode being insulated and placed in the groove; the method including the steps of:

forming the first shield layer;

forming the first insulating layer on the first shield layer;

forming the magnetoresistive element on the first insulating layer;

forming the second insulating layer on the magnetoresistive element and the first insulating layer;

forming the second shield layer on the second insulating layer; and forming the electrode connected to the magnetoresistive element; wherein:

in the step of forming the electrode and the step of forming one of the shield layers, the electrode and the one of the shield layers are formed by forming the at least part of the electrode, and forming the one of the shield layers to surround the at least part of the electrode, an insulating film being placed between the at least part of the electrode and the one of the shield layers.

2. The method according to claim 1, wherein the one of the shield layers is the first shield layer; and in the step of forming the electrode and the step of forming the first shield layer, the electrode and the first shield layer are formed by forming the at least part of the electrode, forming a layer for shielding to be the first shield layer to surround the at least part of the electrode, an insulating film being placed between the at least part of the electrode and the layer for shielding, and flattening the layer for shielding so that the at least part of the electrode is exposed.

3. The method according to claim 1, wherein the one of the shield layers is the first shield layer; and in the step of forming the electrode, the step of forming the first shield layer, and the step of forming the first insulating layer, the electrode, the first shield layer and the first insulating layer are formed by: fabricating a first electrode portion that forms part of the electrode; fabricating a layer for shielding to be the first shield layer to surround the first electrode portion, an insulating film being placed between the first electrode portion and the layer for shielding; fabricating the first shield layer through flattening the layer for shielding so that the first electrode portion is exposed; fabricating the first insulating layer on the first shield layer; and fabricating a second electrode portion on the first insulating layer, the second electrode portion forming part of the electrode and connecting the first electrode portion to the magnetoresistive element.

4. The method according to claim 3, wherein the second electrode portion is formed in a region physically greater than a region where the first electrode portion formed.

5. The method according to claim 1, further including the step of forming an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

6. The method according to claim 1, further including the step of forming an electrode shield layer for shielding the at least part of the electrode so that the electrode shield layer covers the at least part of the electrode.

7. The method according to claim 6, further including the step of forming an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers; wherein:

in the step of forming the electrode shield layer, the electrode shield layer is formed at the same time as one of the magnetic layers of the magnetic transducer.

8. The method according to claim 1, wherein the at least part of the electrode is formed through plating.

9. The method according to claim 1, wherein the one of the shield layers is formed through plating.

* * * * *